United States Patent
Qiu et al.

(10) Patent No.: US 12,469,047 B2
(45) Date of Patent: Nov. 11, 2025

(54) METHOD AND SYSTEM FOR DETECTING FRAUDULENT USER-CONTENT PROVIDER PAIRS

(71) Applicant: YAHOO AD TECH LLC, Dulles, VA (US)

(72) Inventors: Angus Xianen Qiu, Sunnyvale, CA (US); Liang Wang, San Jose, CA (US); Liang Peng, Sunnyvale, CA (US)

(73) Assignee: YAHOO AD TECH LLC, Dulles, VA (US)

( * ) Notice: Subject to any disclaimer, the term of this patent is extended or adjusted under 35 U.S.C. 154(b) by 765 days.

(21) Appl. No.: 15/857,943

(22) Filed: Dec. 29, 2017

(65) Prior Publication Data

US 2019/0205926 A1   Jul. 4, 2019

(51) Int. Cl.
| | |
|---|---|
| G06Q 30/0241 | (2023.01) |
| H04L 9/40 | (2022.01) |
| H04W 12/12 | (2021.01) |

(52) U.S. Cl.
CPC ..... G06Q 30/0248 (2013.01); G06Q 30/0277 (2013.01); H04L 63/1425 (2013.01);
(Continued)

(58) Field of Classification Search
None
See application file for complete search history.

(56) References Cited

U.S. PATENT DOCUMENTS

| | | | | |
|---|---|---|---|---|
| 8,533,825 | B1* | 9/2013 | Marsa | G06Q 30/02 726/22 |
| 9,027,127 | B1* | 5/2015 | Soldo | G06Q 30/02 705/14.2 |

(Continued)

FOREIGN PATENT DOCUMENTS

| | | | |
|---|---|---|---|
| CN | 101442445 A | 5/2009 |
| CN | 106355431 A | 1/2017 |

(Continued)

OTHER PUBLICATIONS

Notice of Allowance mailed Jan. 9, 2020 in Taiwanese Application No. 107133091.

(Continued)

*Primary Examiner* — Michael J Sittner
(74) *Attorney, Agent, or Firm* — Venable LLP

(57) ABSTRACT

The present teaching generally relates to identifying fraudulent content provider-user device pairs. In one embodiment, an initial user risk value and an initial content provider risk value may be determined. A first functional representation of a user risk value may be generated based on the initial user risk value and relational data. A second functional representation of a content provider risk value may be generated based on the initial content provider risk value and the relational data. A converged user risk value and a converged content provider risk value associated with the first and second representations converging may be determined. A pair risk value may be determined based on the converged user risk value and the converged content provider risk value. A fraudulent label may then be applied to interaction events detected by the content provider from the user in response to the risk pair value satisfying a condition.

20 Claims, 22 Drawing Sheets

(52) U.S. Cl.
CPC ...... *H04L 63/1441* (2013.01); *H04L 63/1466* (2013.01); *H04W 12/12* (2013.01)

(56) References Cited

U.S. PATENT DOCUMENTS

| | | | | |
|---|---|---|---|---|
| 2003/0101451 | A1* | 5/2003 | Bentolila | G06Q 30/0254 |
| | | | | 725/35 |
| 2007/0255821 | A1 | 11/2007 | Ge et al. | |
| 2011/0087543 | A1* | 4/2011 | Coon | G06Q 30/02 |
| | | | | 705/14.49 |
| 2016/0350800 | A1 | 12/2016 | Qiu et al. | |
| 2018/0047050 | A1 | 2/2018 | Wong | |
| 2019/0114649 | A1* | 4/2019 | Wang | G06Q 30/02 |

FOREIGN PATENT DOCUMENTS

| | | |
|---|---|---|
| CN | 107437026 A | 12/2017 |
| CN | 108053247 A | 5/2018 |

OTHER PUBLICATIONS

Intention to Grant issued Mar. 17, 2020 in European Application No. 18210538.7.
Extended European Search Report dated Jan. 25, 2019 issued in European Application 18210538.7.
Office Action mailed Jan. 19, 2021 in Chinese Patent Application No. 201811624025.3.
Lanzhou Jiaotong University, Research of Precautionary Technique on Click Fraud in Online Advertising, May 31, 2014, China (50 Pages).

* cited by examiner

METHOD AND SYSTEM FOR DETECTING FRAUDULENT USER-CONTENT PROVIDER PAIRS

BACKGROUND

1. Technical Field

The present teaching generally relates to detecting fraudulent user-content provider pairs. More specifically, the present teaching relates to identifying pairs of users and content providers exhibiting fraudulent behavior in cooperation with one another.

2. Technical Background

Click fraud detection is a known problem in the online business world. Typically, there are four different techniques that click fraud may be performed: (1) host-based attacks, (2) proxy-based attacks, (3) botnet-based attacks, and (4) coalition-based attacks. Host-based attacks refer to an entity, such as a user operating a user device, repeatedly clicking on one or more content items (e.g., an advertisement) presented by a content provider. Proxy-based attacks refer to several content providers being connected to an anonymous proxy to generate a large number of clicks or other user interaction events with one or more content items. Botnet-based attacks refer to a large number of content providers, connected together and control through a botnet, such that a maximum amount of clicks with one or more content items occurs with a minimal likelihood of being detected. Coalition-based attacks refer to one or more attacks that attempt to form, or join into, a group of attackers that launch a coalition attack by sharing resources amongst one another. This can allow a single attacker to obtain an increased amount of clicks (as other members of the group of attackers contribute to the single attacker's click number), while minimizing a likelihood of the single attacker being detected.

Content items (e.g., advertisements) presented on a web page, for example, may yield monetary rewards for content providers hosting the webpage in response to click-type events (e.g., a mouse click, button press, finger press, etc.). Click fraud, as described herein, refers to click-type events for content items made in bad faith. For instance, click fraud events generally may refer to an interaction with a content item whose sole purpose is to generate a monetary gain for a content provider presenting that content item with a minimal likelihood of actual transaction with the content item occurring. Previously, click fraud has been explored at the click-source side or the destination entity side. However, the relationship between the click-source and the destination entity has not been explored to detect click fraud across all of the types techniques that click fraud may be performed Thus, there is a need for methods and systems that identifies fraudulent user-content provider pairs. The present teaching aims to address these issues.

SUMMARY

The teachings disclosed herein relate to methods, systems, and programming for identifying fraudulent content provider-user device pairs. More particularly, the present teaching relates to methods, systems, and programming related to determining when a content provider and a user device are exhibiting fraudulent behavior together.

In one example, a method for identifying fraudulent content provider-user device pairs, implemented on a machine having at least one processor, memory, and communications circuitry capable of connecting to a network is described. An initial user risk value associated with a user device and an initial content provider risk value associated with a content provider may be determined. A first functional representation of a user risk value may be generated based on the initial user risk value and relational data representing a relationship between a plurality of content providers and a plurality of user devices. A second functional representation may be generated based on the initial content provider risk value and the relational data. A converged user risk value and a converged content provider risk value associated with the first representation and the second representation converging may be determined. A pair risk value based on the converged user risk value and the converged content provider risk value may be determined. In response to a condition being satisfied, a fraudulent label may be applied to the content provider and the user device.

In a different example, a system for identifying fraudulent content provider-user device pairs is described. The system includes a user interaction determiner, a content provider interaction determiner, a risk determination system, and a user/content provider suspension system. The user interaction determiner may be configured to determine an initial user risk value associated with a user device. The content provider interaction determiner may be configured to determine an initial content provider risk value associated with a content provider. The risk determination system may be configured to generate a first functional representation of a user risk value based on the initial user risk value and relational data representing a relationship between a plurality of content providers and a plurality of user devices, generate a second functional representation of a content provider risk value based on the initial content provider risk value and the relational data, determine a converged user risk value and a converged content provider risk value associated with the first representation and the second representation converging, and determine a risk pair value based on the converged user risk value and the converged content provider risk value. The user/content provider suspension system may be configured to apply a fraudulent label to the content provider and the user device in response to the pair risk value satisfying a condition.

Other concepts relate to software for implementing the present teaching on identifying fraudulent content provider-user device pairs. A software product, in accord with this concept, includes at least one machine-readable non-transitory medium and information and/or instructions stored thereon. The instructions stored on the medium may include executable program code data, parameters in association with the executable program code, and/or information related to identifying fraudulent content provider-user device pairs.

In one example, a machine-readable, non-transitory and tangible medium having one or more instructions recorded thereon for identifying fraudulent content provider-user device pairs is described. The instructions, when executed by at least one processor of a computing device, may cause the computing device to determine an initial user risk value associated with a user device and an initial content provider risk value associated with a content provider; generate a first functional representation of a user risk value based on the initial user risk value and relational data representing a relationship between a plurality of content providers and a plurality of user devices; generate a second functional representation of a content provider risk value based on the initial content provider risk value and the relational data;

determine a converged user risk value and a converged content provider risk value associated with the first representation and the second representation converging; and apply a fraudulent label to the content provider and the user device in response to the risk pair value satisfying a condition.

Additional novel features will be set forth in part in the description that follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1A:
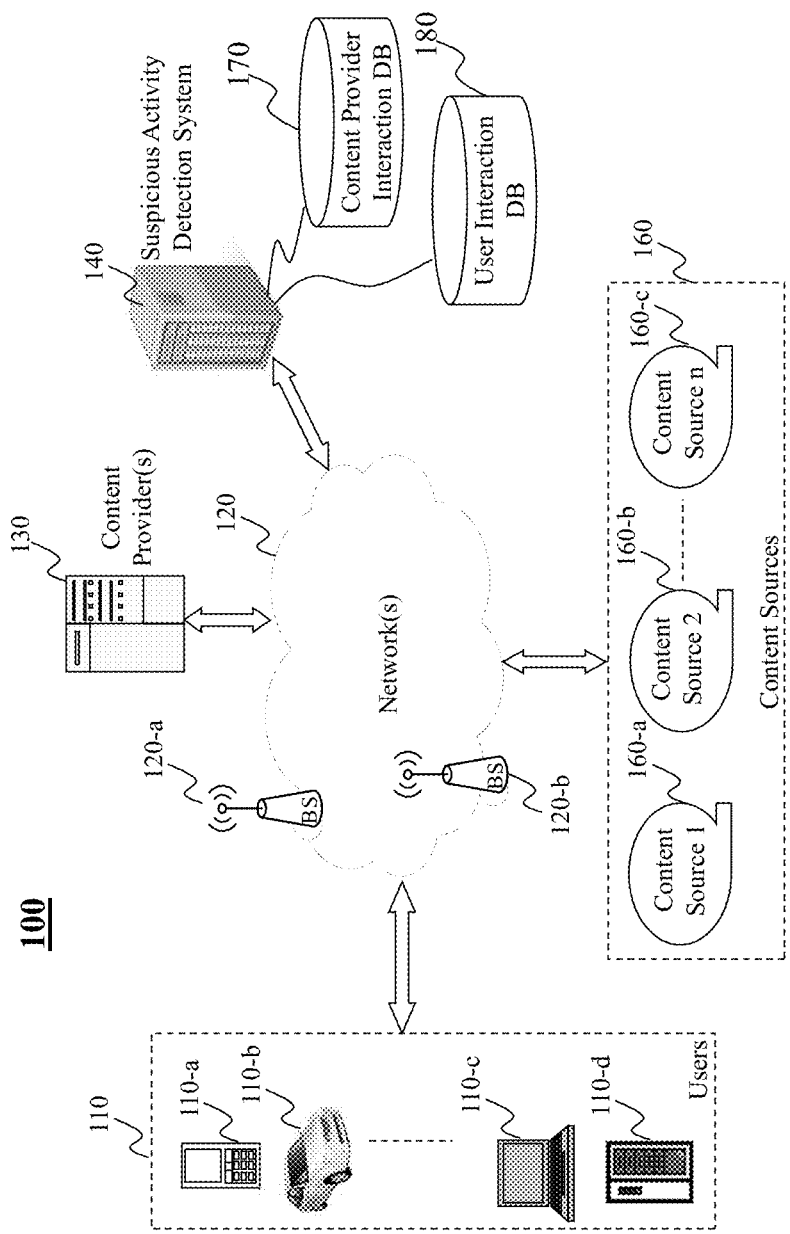
FIGS. 1A and 1B are illustrative diagrams of exemplary network environment for detecting fraudulent user-content provider pairs, in accordance with various embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present disclosure generally relates to systems, methods, medium, and other implementations directed to identify fraudulent user-content provider pairs. The disclosed teaching on identifying fraudulent user-content provider pairs includes, but is not limited to, determining an initial user risk value and an initial content provider risk value, generating function representations for user risk value and content provider risk value, determining a converged user risk value and a converged content provider risk value, determining a risk value pair, and applying a fraudulent label to interaction events detected by the content provider from the user in response to the risk pair value satisfying a condition.

Generally speaking, in online advertising, advertisers seek to attract visitors having interest in a particular product or products being advertised by the advertiser via the Internet. Content providers, also referred to herein as publishers, seek to monetize traffic associated with a web page that they host. The revenue earned by each advertiser and content provider is largely based on an amount—and quality—of traffic that the content provider receives. For instance, an advertiser may bid a greater amount of money for a content provider that has "high" quality traffic than a content provider that has "low" quality traffic. Additionally, content providers may earn more money by obtaining more advertisers if the content providers have higher quality traffic. A similar rationale may apply to content brokers that provide a platform for advertisers and serve to broker between publishers and advertisers. For instance, a platform that has higher quality traffic may facilitate advertisers that bid greater sums of money in an advertising auction, and more content providers may join a platform that attracts greater advertiser bidding.

In the field of online business, and in particular for online advertising, click fraud is a known and serious issue. Click fraud corresponds to click-type events (e.g., mouse clicks, finger presses, swipes, etc.) that are made solely to generate a monetary result with a small to no likelihood of actually of resulting in a site visit or transaction. As each click associated with an advertisement and/or content provider may generate a monetary reward for the corresponding advertiser and/or content provider, fraudulent clicks may result in a fraudulent advertiser, content provider, and/or user receiving money that otherwise could go to a legitimate advertiser, content provider, and/or user.

Click fraud is a difficult problem to detect in the online setting. Generally speaking, click fraud may occur by four techniques. Each technique is slightly different and the usage of one technique over another may be a result on the sophistication of the entity/entities performing the fraudulent action, the resources of the entity/entities, and/or a myriad of other factors. The four techniques correspond to: (1) host-based attacks, (2) proxy-based attacks, (3) botnet-based attacks, and (4) coalition-based attacks.

Host-based attacks refer to an entity, such as a user operating a user device, repeatedly clicking on one or more content items (e.g., an advertisement) presented by a content provider. Proxy-based attacks refer to several content providers being connected to an anonymous proxy to generate a large number of clicks or other user interaction events with one or more content items. Botnet-based attacks refer to a large number of content providers, connected together and control through a botnet, such that a maximum amount of clicks with one or more content items occurs with a minimal likelihood of being detected. Coalition-based attacks refer to one or more attacks that attempt to form, or join into, a group of attackers that launch a coalition attack by sharing resources amongst one another. This can allow a single attacker to obtain an increased amount of clicks (as other members of the group of attackers contribute to the single attacker's click number), while minimizing a likelihood of the single attacker being detected.

Described herein are technical solutions for determining fraudulent activity for a user/content-provider pair, and mitigating the effects of these fraudulent pairs for future events.

Figure 1B:
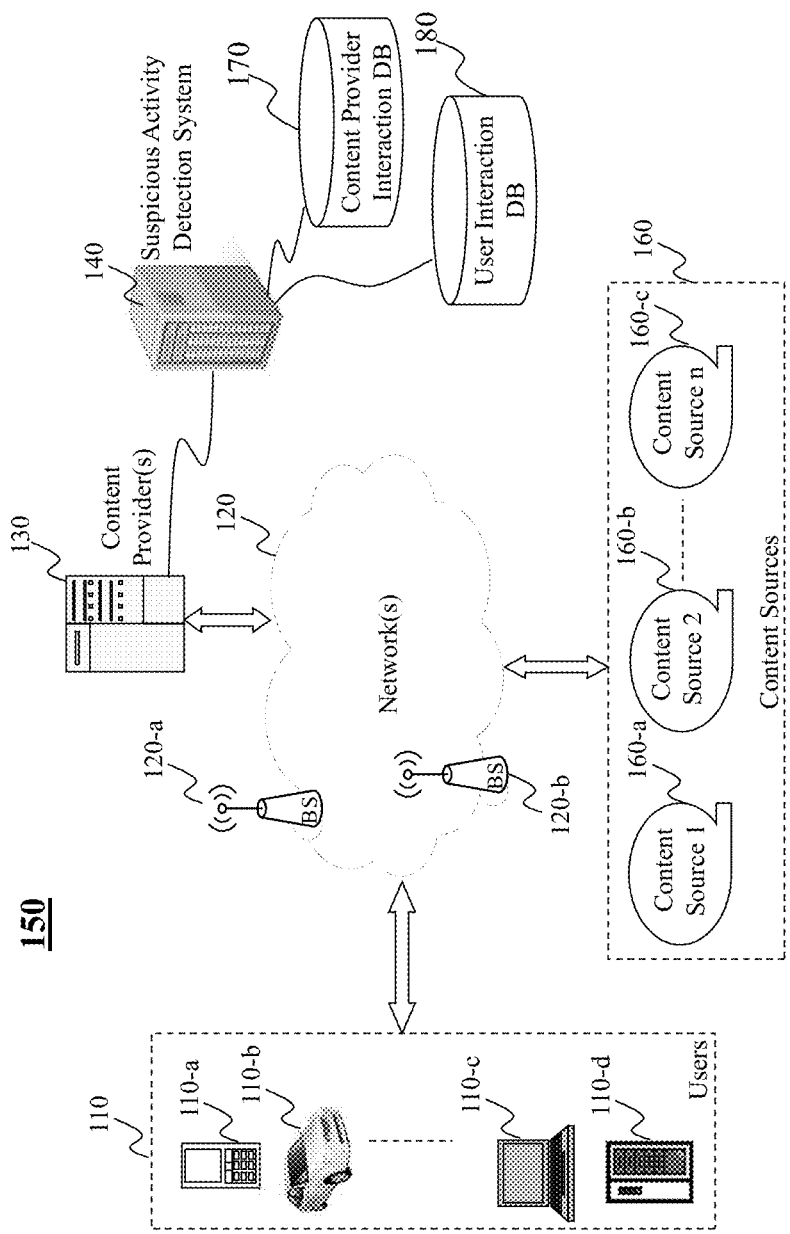

FIGS. 1A and 1B are illustrative diagrams of exemplary network environment for detecting fraudulent user-content provider pairs, in accordance with various embodiments of the present teaching. In FIG. 1A, an exemplary networked environment 100 is described. Content providers, such as publishers, may earn revenue by providing and displaying advertisements on websites. Generally speaking, the greater the number of visitors (e.g., traffic) at that website where the advertisement is displayed, the greater the revenue for the content provider. A fraudulent user, which as described herein may correspond to any individual, group of individuals, business, and/or entity, that is attempting to obtain revenue under false pretenses, may create websites and/or take over an existing website, simulate traffic, and earn revenue via that traffic. Fraudulent users who create multiple sites, each of which only collects a smaller amount of money, may further compound this problem. This may allow the fraudulent users to go unnoticed, as no one website generates enough money to raise suspicion, however collectively the sites may bring in a larger amount of revenue for the fraudster.

In order to for fraudulent users to simulate traffic for each website created, the fraudulent users may need certain data. For example, and without limitation, user devices, browser cookies, internet protocol ("IP") addresses, user agent strings, and the like, may be needed in order to simulate believable traffic. As an illustrative example, multiple browser cookies may be generated by repeatedly extracting a browser cookie from a web browser's cache file, clearing that browser's browsing history, and browsing again thereby generating a new browser cookie. In certain scenarios, fraudulent users may take those extracted browser cookies and place them on additional user devices so that different devices share one or more same browser cookies. User agent strings may also be fraudulently created using web automation tools to alter the user agent string. This, for example, may allow a user agent string that is initially declared as being for one type of operating system to be modified such that it declares itself as being for a different type of operating system. While changing/modifying IP addresses is slightly more difficult, fraudulent users may employ IP botnets or cloud servers to acquire IP addresses, which may even be shared amongst fraudulent users across multiple websites.

FIG. 1A is an illustrative diagram of an exemplary networked environment for detecting fraudulent networks, in accordance with various embodiments of the present teaching. In FIG. 1A, an exemplary networked environment 100 includes may include one or more user devices 110, one or more content provider 130, one or more content sources 160, and a suspicious activity detection system 140, each of which may be capable of communicating with one another via one or more networks 120. Network(s) 120, in some embodiments, may be a single network or a combination of different networks. For example, network(s) 120 may be a local area network ("LAN"), a wide area network ("WAN"), a public network, a private network, a proprietary network, a Public Telephone Switched Network ("PSTN"), the Internet, an intranet, a wireless network, a virtual network, and/or any combination thereof. In one embodiment, network(s) 120 may also include various network access points. For example, networked environment 100 may include wired or wireless access points such as, and without limitation, base stations or Internet exchange points 120-1 . . . 120-2. Base stations 120-1, 120-2 may facilitate, for example, communications to/from user devices 110 with one or more other components of networked environment 100 across network(s) 120.

User devices 110 may be of different types to facilitate one or more users operating user devices 110 to connect to network(s) 120. User devices 110 may correspond to any suitable type of electronic device including, but not limited to, desktop computers 110-$d$, mobile devices 110-$c$ (e.g., mobile phones, smart phones, personal display devices, personal digital assistants ("PDAs"), gaming consoles/devices, wearable devices (e.g., watches, pins/broaches, headphones, etc.), transportation devices 110-$b$ (e.g., cars, trucks, motorcycles, boats, ships, trains, airplanes), mobile computers 110-$c$ (e.g., laptops, ultrabooks), smart devices (e.g., televisions, set top boxes, smart televisions), smart household devices (e.g., refrigerators, microwaves, etc.), and/or smart accessories (e.g., light bulbs, light switches, electrical switches, etc.). A user (e.g., an individual or individuals), in one embodiment, may send data (e.g., a request) and/or receive data (e.g., content) via user devices 110.

Content sources 160 may include one or more content sources 160-1, 160-2, and 160-3, in some embodiments. Although three content sources are shown within environment 100, any number of content sources may be included. Content sources 160 may correspond to any suitable content source, such as, and without limitation, an individual, a business, an organization, and the like, which may be referred to herein collectively as an "entity" or "entities." For example, content sources 160 may correspond to a government website, a news site, a social media website, and/or a content feed source (e.g., a blog). In some embodiments, content sources 160 may be vertical content sources. Each content source 160 is configured to generate and send content to one or more of user devices 110 via network(s) 120. The content (e.g., a webpage, advertisement, etc.) may include information consumable by a user via their user device 110.

Content provider(s) 130 may correspond to one or more content providers such as, and without limitation, a publisher or publishers that publish content and/or advertisements, and or a content broker that facilitates brokering of content/advertisements for publishers and advertisers. For example, content provider(s) 130 may be configured to present content obtained from one or more of content sources 160. In some embodiments, content provider(s) 130 may present one or more advertisements thereon, which may be selected from an advertisement database, an advertisement source, and/or any other suitable entity (e.g., content source 160). In some embodiments, content provider(s) 130 is/are configured to provide product(s) and/or service(s), and may be configured to handle the advertising process for its own product(s) and/or a service (e.g., websites, mobile applications, etc.) related to advertising, or a combination thereof. For example, content providers 130 may include such systems as an advertising agency or a dealer of advertisement that operates a platform that connects an advertiser or advertising agency one or more additional entities.

Suspicious activity detection system 140, in one embodiment, may be configured to detect and identify fraudulent user-content provider pairs. In some embodiments, suspicious activity detection system 140 may determine initial values for user risk and content provider risk. For example, the initial user risk value and the initial content provider risk value may be associated with a click-through-rate ("CTR") for a user (e.g., a visitor of a webpage) and a content provider (e.g., a publisher), respectively. User CTR, in one embodiment, relates to how many content items (e.g., advertisements) out of a total number of content items displayed to a user that that user interacted with (e.g., clicked). Content provider CTR, in one embodiment, relates to how many content items were clicked out of a total number of content items displayed by the content provider. In some embodiments, user CTR may be determined based on interaction data stored by a user interaction database 180, while content provider CTR may be determined based on interaction data stored by a content provider interaction database 170. Although separate databases 170 and 180 are shown within networked environment 100 (and also in networked environment 150 of FIG. 1B), persons of ordinary skill in the art will recognize that a single interaction database including interaction data associated with both users and content providers may alternatively be employed, and the aforementioned is merely illustrative.

Suspicious activity detection system 140 may be configured to generate a risk values for both a user and a content provider. In some embodiments, the risk values, which may also be referred to herein as "suspicion degrees," for the user and the suspicious degree for the content provider may be determined iteratively together, and may be based on relational data. The relational data may represent a relationship between each of a plurality of content providers associated with networked environment 100 and each user device 110. In one embodiment, the relational data may correspond to a transition matrix, which may indicate a number of clicks detected by the i-th content provider from the j-th user. In some embodiments, the relational data may be weighted based on total traffic. Furthermore, relational data associated with both user to content provider transitions and content provider to user transitions may be employed. Using the respective relational data and the initial risk values (e.g., CTRs), representations for risk values of both the user and the content provider may be determined, and the representations may be iteratively calculated until convergence is reached.

After reaching convergence, a converged user risk value and a converged content provider risk value may be identified, and a pair risk value may be determined. The determined pair risk value may be determined based on the converged user risk value and the converged content provider risk value, as well as the respective relational data. Suspicious activity detection system 140 may then be configured to determine whether the pair risk value satisfies a condition. For example, suspicious activity detection system 140 may determine whether the pair risk value is equal to or greater than a threshold risk value. If the condition is met (e.g., the pair risk value is greater than or equal to the threshold risk value), then the user and content provider associated with the user-content provider pair, may have a fraudulent label applied thereto such that future events detected by the content provider from the user are flagged and prevented from resulting in monetary gain by the content provider (and user).

Networked environment 150 of FIG. 1B, in one illustrative embodiment, may be substantially similar to networked environment 100 of FIG. 1A, with the exception that suspicious activity detection system 140 may serve as a backend for content provider(s) 130. Alternatively, content provider(s) 130 may serve as a backend for suspicious activity detection system 140.

Figure 2A:
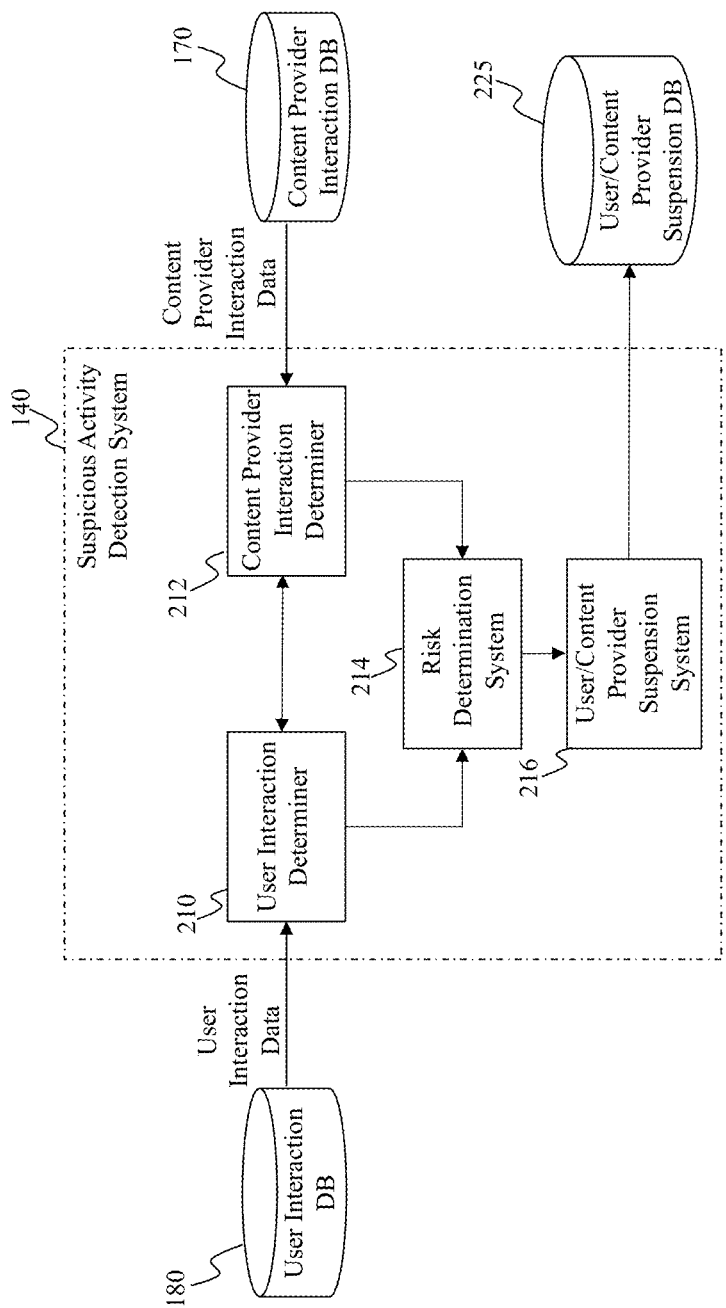
FIG. 2A is an illustrative diagram of an exemplary suspicious activity detection system, in accordance with various embodiments of the present teaching.

FIG. 2A is an illustrative diagram of an exemplary suspicious activity detection system, in accordance with various embodiments of the present teaching. In the non-limiting embodiment, suspicious activity detection system 140 may include, amongst other features, a user interaction determiner 210, a content provider interaction determiner 212, a risk determination system 214, and a user/content provider suspension system 216.

In some embodiments, suspicious activity detection system 140 may include one or more processors, memory, and communications circuitry. The one or more processors of suspicious activity detection system 140 may include any suitable processing circuitry capable of controlling operations and functionality of one or more components/modules of suspicious activity detection system 140, as well as facilitating communications between various components within suspicious activity detection system 140 and/or with one or more other systems/components of network environments 100, 150. In some embodiments, the processor(s) may include a central processing unit ("CPU"), a graphic processing unit ("GPU"), one or more microprocessors, a digital signal processor, or any other type of processor, or any combination thereof. In some embodiments, the functionality of the processor(s) may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of the processor(s) may include its own local memory, which may store program systems, program data, and/or one or more operating systems. However, the processor(s) may run an operating system ("OS") for one or more components of suspicious activity detection system 140 and/or one or more firmware applications, media applications, and/or applications resident thereon. In some embodiments, the processor(s) may run a local client script for reading and rendering content received from one or more websites. For example, the processor(s) may run a local JavaScript client for rendering HTML or XHTML content received from a particular URL accessed by user device(s) 110.

The memory may include one or more types of storage mediums such as any volatile or non-volatile memory, or any removable or non-removable memory implemented in any suitable manner to store data for suspicious activity detection system 140. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, the memory may be implemented as computer-readable storage media ("CRSM"), which may be any available physical media accessible by the processor(s) to execute one or more instructions stored within the memory.

The communications circuitry may include any circuitry allowing or enabling one or more components of suspicious activity detection system 140 to communicate with one another, and/or with one or more additional devices, servers, and/or systems. In some embodiments, communications between one or more components of suspicious activity detection system 140 may be communicated with user devices 110, content sources 160, content provider(s) 130, etc., via the communications circuitry. For example, network(s) 120 may be accessed using Transfer Control Protocol and Internet Protocol ("TCP/IP") (e.g., any of the protocols used in each of the TCP/IP layers), Hypertext Transfer Protocol ("HTTP"), WebRTC, SIP, and/or wireless application protocol ("WAP"). Various additional communication protocols may be used to facilitate communications between various components of suspicious activity detection system 140, including, but not limited to, Wi-Fi (e.g., 802.11 protocol), Bluetooth, radio frequency systems (e.g., 800 MHz, 1.4 GHz, and 5.6 GHz communication systems), cellular networks (e.g., GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

The communications circuitry may use any communications protocol, such as any of the previously mentioned exemplary communications protocols. In some embodiments, one or more components of suspicious activity detection system 140 may include one or more antennas to facilitate wireless communications with a network using various wireless technologies (e.g., Wi-Fi, Bluetooth, radiofrequency, etc.). In yet another embodiment, one or more components of user activity detection system may include one or more universal serial bus ("USB") ports, one or more Ethernet or broadband ports, and/or any other type of hardwire access port so that the communications circuitry facilitates communications with one or more communications networks.

Suspicious activity detection system 140, in the illustrative embodiment, may be configured to determine whether a particular pair of a user device and a content provider are exhibiting fraudulent behavior. If so, the user device/content provider pair may be flagged such that future interaction events with the content provider by the user device do not result in monetary rewards being provided to the content provider and/or user device.

User interaction determiner 210, in one embodiment, may be configured to identify, generate, and output user event data associated with user interactions with content provider(s) 130. User interaction determiner 210 may be in communication with user interaction database 180, which as mentioned previously, may store interaction data associated each user device 110 that interacts with each content provider 130. In some embodiments, user interaction database 180 may store CTRs for each user device 110 in relation to each content provider 130. For example, user interaction database 180 may store, for each user device 110, a number of content items (e.g., advertisements) that a corresponding user device 110 interacts with (e.g., clicks on) in relation to a total number of content items presented to the corresponding user device 110 for each content provider 130.

In some embodiments, user interaction determiner 210 may obtain user interaction data from user interaction database 180 at various temporal intervals. For example, user interaction data may be obtained from user interaction database 180 every few minutes, every hour, every day, and so on. Upon receipt, user interaction determiner 210 may be configured to determine one or more user interaction parameters associated with the user interaction data. For example, user interaction determiner 210 may determine a CTR, a time-to-click ("TTC") rate, and/or any other type of interaction parameter represented by the interaction data. Based on the user interaction parameter, user interaction determiner 210 may be configured to determine an initial user risk value, as well as a representation for the user risk value as a function of initial user risk value, relational data representing a relationship between each content provider 130 and each of the plurality of user devices 110, and a representation of a content provider risk value.

Content provider interaction determiner 212, in one embodiment, may operate in a substantially similar manner as user interaction determiner 210, with the exception that content provider interaction determiner 212 is capable of identifying, generating, and outputting content provider event data associated with content provider interactions from user device(s) 110. Content provider interaction determiner 212 may be in communication with content provider interaction database 170, which as mentioned previously, may store interaction data associated each content provider 130 from each user device 110. In some embodiments, content provider interaction database 170 may store CTRs for each content provider 130 in relation to each user device 110. For example, content provider interaction database 170 may store, for each content provider 130, a number of content items (e.g., advertisements) that presented by that content provider 130 to each user device 110, and which of those content items have been interacted with by each user device 110.

In some embodiments, content provider interaction determiner 212 may obtain content provider interaction data from content provider interaction database 170 at various temporal intervals. For example, content provider interaction data may be obtained from content provider interaction database 170 every few minutes, every hour, every day, and so on. Upon receipt, content provider interaction determiner 212 may be configured to determine one or more content provider interaction parameters associated with the content provider interaction data. For example, content provider interaction determiner 212 may determine a CTR, a time-to-click ("TTC") rate, and/or any other type of interaction parameter represented by the content provider interaction data. Based on the content provider interaction parameter, content provider interaction determiner 212 may be configured to determine an initial content provider risk value, as well as a representation for the content provider risk value as a function of initial content provider risk value, relational data representing a relationship between each user device 110 and each content provider 130, and the representation of the user risk value.

Risk determination system 214 may, in some embodiments, be configured to determine one or more of an initial user risk value, an initial content provider risk value, and a user-content provider pair risk value. As mentioned above, a representation of the user risk value and the content provider risk value may be generated based on the initial user risk value, the initial content provider risk value, the relational data, and the content provider risk value representation and the user risk value representation, respectively. Furthermore, risk determination system 214 may be configured to iterate the representation of the user risk value and the representation of the content provider risk value until convergence is reached. Upon convergence, a converged user risk value and a converged content provider risk value may be determined. The converged user risk value and the converged content provider risk value may be combined, based in part on a weighted/normalized version of the relational data associated with user-to-content provider transitions and content provider-to-user transitions, respectively, to generate the user-content provider pair risk value.

User/content provider suspension system 216 may, in one embodiment, be configured to obtain the user-content provider pair risk value, and may determine whether the user-content provider pair risk value meets a condition. For example, the condition may be that the user-content provider pair risk value is greater than or equal to a threshold value. If the condition is met (e.g., the user-content provider pair risk value is greater than or equal to the threshold value), then user/content provider suspension system 216 may be configured to suspend the corresponding content provider 130 and user device 110. In some embodiments, suspending content provider 130 and user device 110 may correspond to user/content provider suspension system 216 applying a fraudulent label flag to interaction events detected by the content provider from that user device. Therefore, if a future interaction event is detected by the content provider 130 from that user device 110, then that event may be suppressed from causing content provider 130 and/or user device 110 from receiving any monetary reward. In some embodiments, if the condition is met, user/content provider suspension system 216 may flag and store the user device-content provider pair within user/content provider suspension database 225. Therefore, each time a future event is detected from user device 110 by content provider 130, suspicious activity detection system 140 may access user/content provider suspension database 225, identify that the pair of user device 110 and content provider 130 includes the fraudulent label, and may prevent the event from registering a monetary reward for content provider 130 and/or user device 110.

Figure 2B:
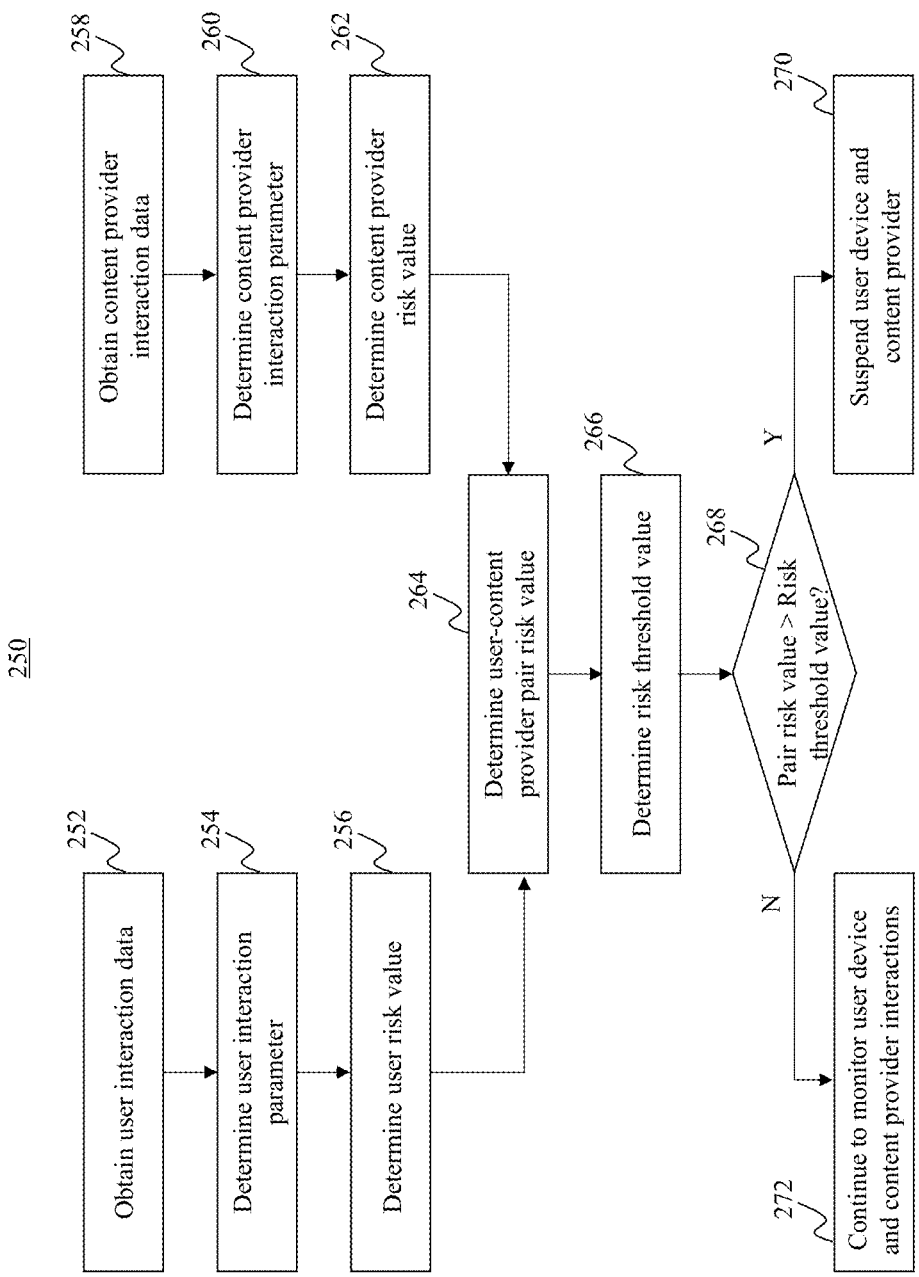
FIG. 2B is an illustrative flowchart of an exemplary process for detecting suspicious activity for user-content provider pairs, in accordance with various embodiments of the present teaching.

FIG. 2B is an illustrative flowchart of an exemplary process for detecting suspicious activity for user-content provider pairs, in accordance with various embodiments of the present teaching. Process 250, in a non-limiting embodiment, may begin at step 252. At step 252, user interaction data may be obtained. For instance, user interaction determiner 210 may obtain user interaction data from user interaction database 180. In some embodiments, the user interaction data may be obtained at predefined temporal intervals. For example, user interaction data may be obtained every few minutes, every hour, every few hours, daily, etc. In some embodiments, the user interaction data may indicate which content items presented by a content provider a user has interacted with for each content provider 130 within networked environment 100, 150 and for each user device 110.

At step 254, a user interaction parameter may be determined. For example, a CTR for each user device 110 in association with each content provider 130 may be determined. In some embodiments, the CTR may be determined based on the interaction data. In other embodiments, however, CTR information may be included within the interaction data obtained at step 252. At step 256, a user risk value may be determined. In some embodiments, an initial user risk value may be selected as the CTR for each user device 110 for each content provider 130. Furthermore, in some embodiments, a representation of a user risk value may be determined based on the initial user risk value, relational data representing a relationship between interactions of each user device 110 and each content provider 130, and a representation of a content provider risk value (as described in relation to steps 258-262).

While process 250 is described as beginning at step 252, persons of ordinary skill in the art will recognize that, alternatively, process 250 may begin at step 258. Additionally, in some embodiments, steps 252-256 and steps 258-262 may be performed in parallel by suspicious activity detection system 140.

At step 258, content provider interaction data may be obtained. For instance, content provider interaction determiner 212 may obtain content provider interaction data from content provider interaction database 170. Step 258 may, in some embodiments, be substantially similar to step 252, with the exception that at step 258 the interaction data relates to content provider interaction data. At step 260, a content provider interaction parameter may be determined. Similarly to step 254, the content provider interaction parameter may correspond to a content provider CTR associated with each content provider 130. At step 262, a content provider risk value may be determined. In some embodiments, step 262 may be substantially similar to step 256, with the exception that at step 262, the CTR for each content provider 130 may be selected as the initial content provider risk value. Furthermore, in some embodiments, a representation of a content provider risk value may be determined based on the initial content provider risk value, relational data representing a relationship between interactions of each content provider 130 and each user device 110, and a representation of the user risk value (as described in relation to steps 252-256).

At step 264, a user device-content provider pair risk value may be determined. For instance, risk determination system 214 may be configured to obtain the representation of the user risk value, the representation of the content provider risk value, and relational data for user device to content provider transitions and content provider to user device transitions. Risk determination system 214 may then be able to perform iterations to the representations in order to determine when/if the representations converge. For example, convergence may be said to be obtained when a change in the representations from one iteration to a subsequent iteration is less than a convergence value. In response to determining that the representations converge, as detailed below, a converged user risk value and a converged content provider risk value may be obtained. Using the converged user risk value and the converged content provider risk value, a user device-content provider pair risk value may be obtained.

At step 266, a risk threshold value may be determined. In some embodiments, user/content provider suspension system 216 may store a risk threshold value. The risk threshold value may, for example, be pre-set, obtained, and/or selected from a number of risk threshold values stored within memory by user/content provider suspension system 216. At step 268, a determination may be made as to whether the user device-content provider pair risk value is greater than (or equal to) the risk threshold value. For instance, user/content provider suspension system 216 may perform this determination.

If, at step 268, it is determined that the user device-content provider pair risk value is greater than, or equal to, the risk threshold value, then process 250 may proceed to step 270. At step 270, the user device and the content provider may be suspended. For example, user/content provider suspension system 216 may apply a fraudulent label (E.g., a metadata flag) to the user device and content provider such that future interactions with the content provider by the user device do not result in any rewards being received by the content provider and/or the user. In some embodiments, the fraudulent label may be stored in associated with the content provider and the user device within user/content provider suspension database 225. If, however, at step 268, it is determined that the pair risk value is less than the risk threshold value, then process 250 may proceed to step 272. At step 272, interactions between the user device and the content provider may continue to be monitored. In this particular scenario, process 250 may, in some embodiments, repeat (e.g., steps 252-268).

Figure 3A:
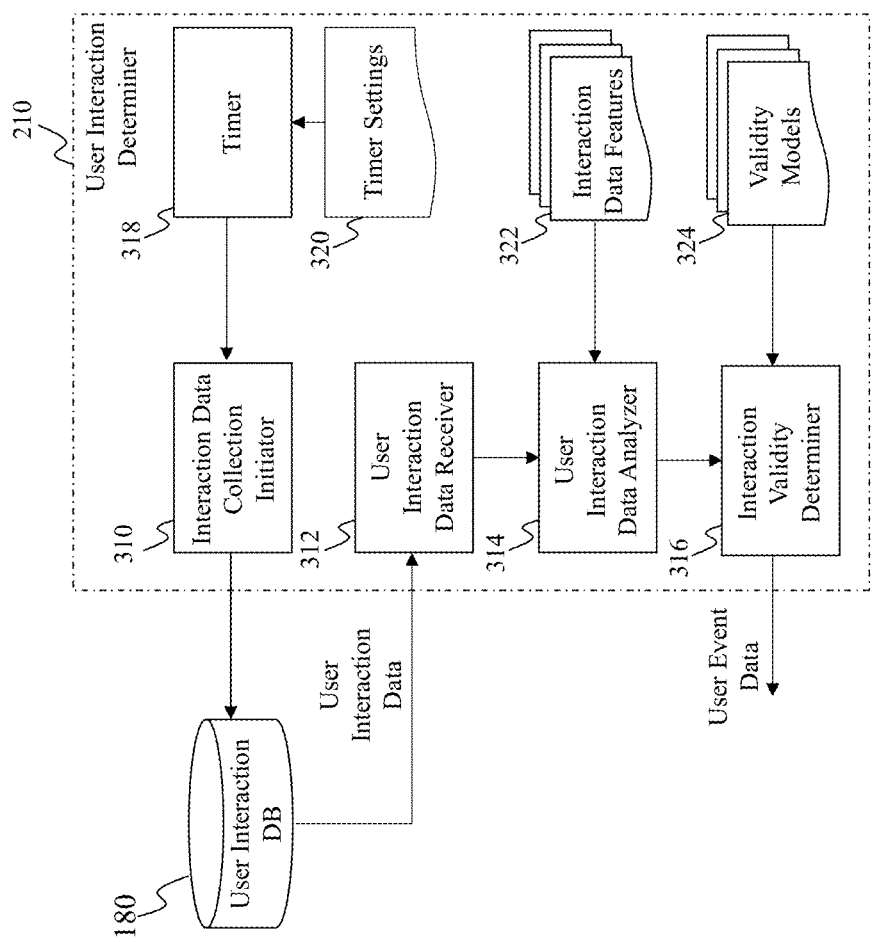
FIG. 3A is an illustrative diagram of an exemplary user interaction determiner, in accordance with various embodiments of the present teaching.

FIG. 3A is an illustrative diagram of an exemplary user interaction determiner, in accordance with various embodiments of the present teaching. User interaction determiner 210, in the illustrative embodiment, may include an interaction data collection initiator 310, a user interaction data receiver 312, a user interaction data analyzer 314, an interaction validity determiner 316, and a timer 318. In some embodiments, user interaction determiner 210 may implement one or more computer programs stored within memory using one or more processors in order to perform the functions associated with interaction data collection initiator 310, user interaction data receiver 312, user interaction data analyzer 314, interaction validity determiner 316, and timer 318.

Interaction data collection initiator 310 may, in one embodiment, be configured to generate and send a request for user interaction data to user interaction database 180. Interaction data collection initiator 310 may include one or more computer programs that cause the request to be generated and sent, where the one or more computer programs are capable of being stored within memory and executable via one or more processors associated with user interaction determiner 210. Interaction data collection initiator 310 may be in communication with timer 318. Timer 318 may employ one or more timer settings 320, which may indicate to timer 318 when an amount of time has elapsed, thereby causing timer 318 to send an instruction to interaction data collection initiator 310 to generate and send the request for user interaction data. In some embodiments, timer 318 may be configured, based on one or more computer programs stored within memory and executable via one or more processors associated therewith, to determine a most recent data collection request and/or receipt of interaction data, and may begin timing upon this event occurring. In response to timer setting 320 determining that a predetermined temporal duration has elapsed since the event occurred, timer 318 may notify interaction data collection initiator 310 that user interaction data is to be retrieved from user interaction database 180. In some embodiments, timer 318 may, alternatively or additionally, determine when a predetermined amount of time, stored by timer settings 320, has elapsed and send the notification to interaction data collection initiator 310 tin response. Further still, interaction data collection initiator 310 may be configured to request user interaction data in response to an additional request being received (e.g., from user device 110).

User interaction data receiver 312 is configured to receive user interaction data from user interaction database 180 in response to the request being sent from interaction data collection initiator 310. The received user interaction data may, in one embodiment, relate to user interactions with one or more content providers (e.g., content provider(s) 130) during a certain temporal duration. For example, the user interaction data may include user interactions (e.g., clicks, scrolls, presses, swipes, etc.) from user device(s) 110 with content items presented by content provider 130 that occurred of the a most recent few minutes, hours, days, etc. In some embodiments, the user interaction data may correspond to user interactions with content items presented by content provider 130 that occurred since a last instance of user interaction data was retrieved. In this particular scenario, user interaction data receiver 312 may include computer programs stored within memory and executable via one or more processors that cause a notification to be sent to timer 318 in response to each instance of user interaction data being received. The notification may cause timer 318 to "reset," such that timer 318 begins timing again. Upon the one or more timer settings 320 being satisfied (e.g., a temporal duration elapsing), timer 318 may again notify interaction data collection initiator 310 to request new user interaction data from user interaction database 180, which is then received by user interaction data receiver 312, thereby causing the process to repeat. Furthermore, user interaction data receiver 312 may provide the user interaction data that has been received to user interaction data analyzer 314.

User interaction data analyzer 314, in one embodiment, may be configured to analyze the user interaction data using one or more interaction data features 322. User interaction data features, for instance, may correspond to criteria that is to be analyzed by user interaction data analyzer. For example, interaction data features 322 may include, but are not limited to, CTRs, TTCs, scroll speeds, dwell times, and the like. User interaction data analyzer 314 may determine, for example, a CTR associated with the received user interaction data. The CTR, for instance, may correspond to a number of content items interacted with by a particular user device 110 out of a total number of content items displayed to that user device 110 may a particular content provider 130. User interaction data analyzer 314 may, therefore, be configured, in some embodiments, to determine the CTR for each user device 110 that interacted with each content provider 130, which may be represented by the user interaction data. In some embodiments, user interaction data analyzer 314 may include one or more computer programs that cause one or more processors to analyze the user interaction data in accordance with the interaction data feature 322 being employed. User interaction data analyzer 314 may then be capable of providing, to interaction validity determiner, data representing a list of events to be validated by interaction validity determiner 316. The list of events may include events associated with each user device 110 that are detected by each content provider 130. The list of events may include events that are fraudulent, non-fraudulent, inconclusive, and/or extraneous. In some embodiments, each user event of the list of user events may be logged within user event log 326. User event log 326 may, for example, store indications of all of the user events that were identified by user interaction data analyzer 314, which may be stored within user interaction database 180 and/or any other database for review and analysis by a system administrator, user, and the like.

Interaction validity determiner 316 may be configured to determine a validity of the events. In some embodiments, interaction validity determiner 316 may employ one or more validity models 324, which may be used to assess whether a given event from the interaction data is a valid event capable of being used to determine fraudulent behavior. For instance, not all events may be reflective of fraudulence. As an illustrative example, an event that results in a conversion (e.g., a content item is clicked on and a purchase results from the click) may not be useful in identifying click fraud. Interaction validity determiner 316 may implement one or more computer programs via one or processors to identify, using validity model(s) 324, which events are valid and which events are invalid, for the purposes of identifying click fraud. Interaction validity determiner 316 may, in some embodiments, be configured to generate user event data representing one or more user events detected by each content provider 130 from each user device 110, and may output the user event data to risk determination system 214.

Figure 3B:
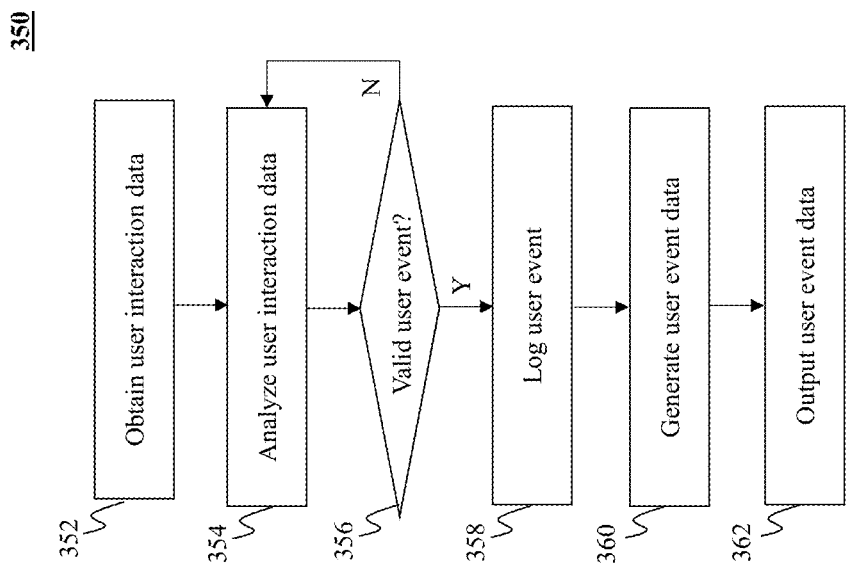
FIG. 3B is an illustrative flowchart of an exemplary process for generating and outputting user event data, in accordance with various embodiments of the present teaching.

FIG. 3B is an illustrative flowchart of an exemplary process for generating and outputting user event data, in accordance with various embodiments of the present teaching. Process 350, in a non-limiting embodiment, may begin at step 352. At step 352, user interaction data may be obtained. For instance, user interaction data receiver 312 may obtain user interaction data from user interaction database 180. In some embodiments, the user interaction data may be obtained in response to a request being sent from interaction data collection initiator 310, which may be a result of timer 318 notifying interaction data collection initiator 310 that a predefined temporal duration has elapsed.

At step 354, the user interaction data may be analyzed. For instance, user interaction data analyzer 314 may analyze the user interaction data. In some embodiments, user interaction data analyzer 314 may employ interaction data features 322 to determine a list of events that were detected by content provider 130 for each user device 110. A step 356, a determination may be made as to whether each user event included within the list of events is valid. For instance, interaction validity determiner 316 may employ validity models 324 to determine whether each event from the list is to be used for determining/performing an analysis of click fraud.

If, at step 356, it is determined that a particular user event is not valid, then process 350 may return to step 354. In this particular scenario, a subsequent event from the list of events may be analyzed and process 350 may return to step 356 where a new determination is made as to whether the new subsequent event is valid. This loop (e.g., steps 354, 356) may repeat for each user event included within the list of events. If, however, at step 356 it is determined that the user event is a valid user event, then process 350 may proceed to step 358. At step 358, the valid user event may be logged. For example, the valid user event may be logged in user event log 326.

At step 360, user event data may be generated. For example, interaction validity determiner 316 may be configured to generate user event data representing one or more of the valid user events that have been identified. At step 362, the user event data may be output. For example, the user event data may be provide to risk determination system 214.

Figure 4A:
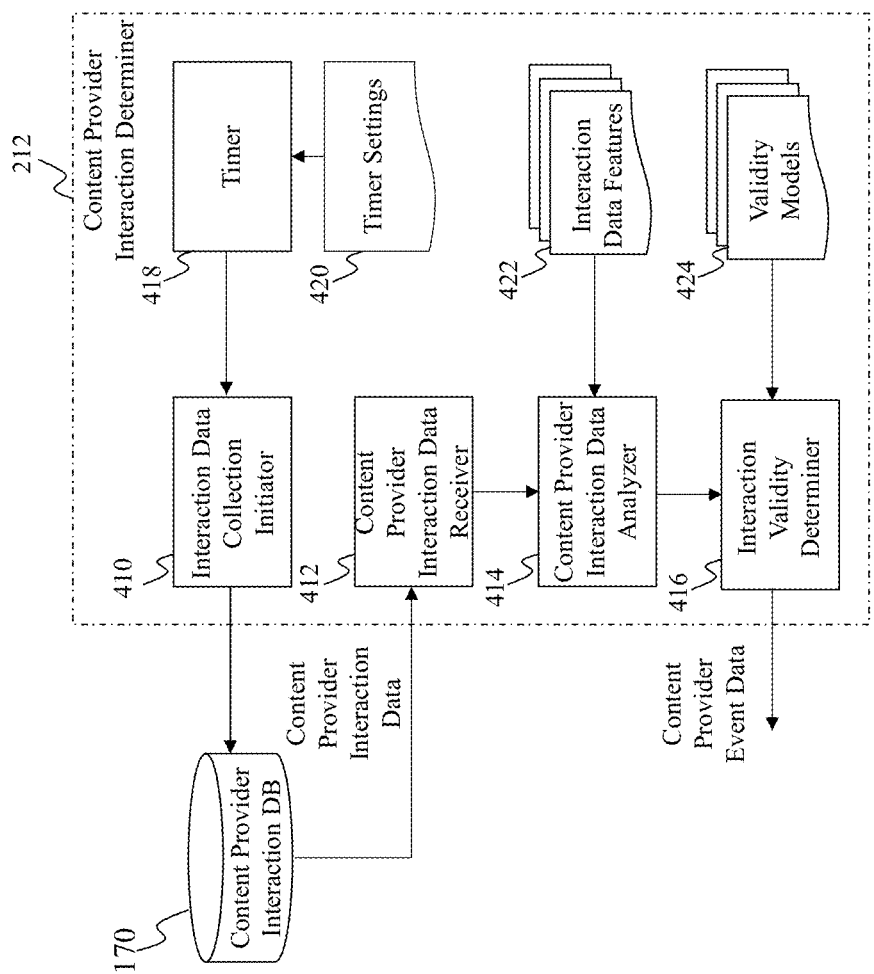
FIG. 4A is an illustrative diagram of an exemplary content provider interaction determiner, in accordance with various embodiments of the present teaching.

FIG. 4A is an illustrative diagram of an exemplary content provider interaction determiner, in accordance with various embodiments of the present teaching. Content provider interaction determiner 212, in the illustrative embodiment, may include an interaction data collection initiator 410, a content provider interaction data receiver 412, a content provider interaction data analyzer 414, an interaction validity determiner 416, and a timer 418. In some embodiments, one or more of interaction data collection initiator 410, content provider interaction data receiver 412, content provider interaction data analyzer 414, interaction validity determiner 416, and timer 418 may be substantially similar to interaction data collection initiator 310, user interaction data receiver 312, user interaction data analyzer 314, interaction validity determiner 316, and timer 318 of FIG. 3A, with the exception that interaction data collection initiator 410, content provider interaction data receiver 412, content provider interaction data analyzer 414, interaction validity determiner 416, and timer 418 are associated with content provider interaction determiner 212. In some embodiments, content provider interaction determiner 212 may implement one or more computer programs stored within memory using one or more processors in order to perform the functions associated with interaction data collection initiator 410, content provider interaction data receiver 412, content provider interaction data analyzer 414, interaction validity determiner 416, and timer 418.

Configure interaction data collection initiator 410 may, in one embodiment, to generate and send a request for content provider interaction data to content provider interaction database 170. Interaction data collection initiator 410 may include one or more computer programs that cause the request to be generated and sent, where the one or more computer programs are capable of being stored within memory and executable via one or more processors associated with content provider interaction determiner 212. Interaction data collection initiator 410 may be in communication with timer 418. Timer 418 may employ one or more timer settings 420, which may indicate to timer 418 when an amount of time has elapsed, thereby causing timer 418 to send an instruction to interaction data collection initiator 410 to generate and send the request for content provider interaction data. Timer settings 420, furthermore, may be substantially similar to timer settings 320 of FIG. 3A, and the previous description may apply. In some embodiments, timer 418 may be configured, based on one or more computer programs stored within memory and executable via one or more processors associated therewith, to determine a most recent data collection request and/or receipt of interaction data, and may begin timing upon this event occurring. In response to timer 418 indicating that a predetermined temporal duration has elapsed since the event occurred, timer 418 may notify interaction data collection initiator 410 that content provider interaction data is to be retrieved from content provider interaction database 170. In some embodiments, timer 418 may, alternatively or additionally, determine when a predetermined amount of time, indicated by timer settings 420, has elapsed and send the notification to interaction data collection initiator 410 in response. Further still, interaction data collection initiator 410 may be configured to request content provider interaction data in response to an additional request being received (e.g., from user device 110).

Content provider interaction data receiver 412 is configured to receive content interaction data from content provider interaction database 170 in response to the request being sent from interaction data collection initiator 410. The content provider interaction data received may, in one embodiment, relate to content provider interactions with one or more user devices (e.g., user device(s) 110) during a certain temporal duration. For example, the content provider interaction data may include interactions (e.g., clicks, scrolls, presses, swipes, etc.) detected by content provider(s) 130 for content items presented by content provider(s) 130 that occurred within a most recent few minutes, hours, days, etc. In some embodiments, the content provider interaction data may correspond to content provider interactions by users with content items presented by content provider(s) 130 that occurred since a last instance of content provider interaction data was retrieved. In this particular scenario, content provider interaction data receiver 412 may include computer programs stored within memory and executable via one or more processors that cause a notification to be sent to timer 418 in response to each instance of content provider interaction data being received. The notification may cause timer 418 to "reset," such that timer 418 begins timing again. Upon the one or more timer settings 420 being satisfied (e.g., a temporal duration elapsing), timer 418 may again notify interaction data collection initiator 410 to request new content provider interaction data from content provider interaction database 170, which is then received by content provider interaction data receiver 412, thereby causing the process to repeat. Furthermore, content provider interaction data receiver 412 may provide the content provider interaction data that has been received to content provider interaction data analyzer 414.

Content provider interaction data analyzer 414, in one embodiment, may be configured to analyze the content provider interaction data using one or more interaction data features 422. Content provider interaction data features, for instance, may correspond to criteria that is to be analyzed by content provider interaction data analyzer. For example, interaction data features 422 may include, but are not limited to, CTRs, TTCs, scroll speeds, dwell times, and the like. Content provider interaction data analyzer 414 may determine, for example, a CTR associated with the received content provider interaction data. The CTR, for instance, may correspond to a number of content items interacted out of a total number of content items displayed to by a particular content provider 130. Content provider interaction data analyzer 414 may, therefore, be configured, in some embodiments, to determine the CTR for each content provider 130 in relation to each user device 110, which may be represented by the content provider interaction data. In some embodiments, content provider interaction data analyzer 414 may include one or more computer programs that cause one or more processors to analyze the content provider interaction data in accordance with the interaction data feature 422 being employed. Content provider interaction data analyzer 414 may then be capable of providing, to interaction validity determiner 416, data representing a list of events to be validated by interaction validity determiner 416. The list of events may include events detected by each content provider 130 for each user device 110. The list of events may include events that are fraudulent, non-fraudulent, inconclusive, and/or extraneous. In some embodiments, each content provider event of the list of content provider events may be logged within content provider event log 426. Content provider event log 426 may, for example, store indications of all of the content provider events that were identified by content provider interaction data analyzer 414, which may be stored within content provider interaction database 170 and/or any other database for review and analysis by a system administrator, user, and the like.

Interaction validity determiner 416 may be configured to determine a validity of the events. In some embodiments, interaction validity determiner 416 may employ one or more validity models 424, which may be used to assess whether a given event from the interaction data is a valid event capable of being used to determine fraudulent behavior. Interaction validity determiner 416 may implement one or more computer programs via one or processors to identify, using validity model(s) 424, which events are valid and which events are invalid, for the purposes of identifying click fraud. Interaction validity determiner 416 may, in some embodiments, be configured to generate content provider event data representing one or more content provider events detected by each content provider 130 from each user device 110, and may output the content provider event data to risk determination system 214.

Figure 4B:
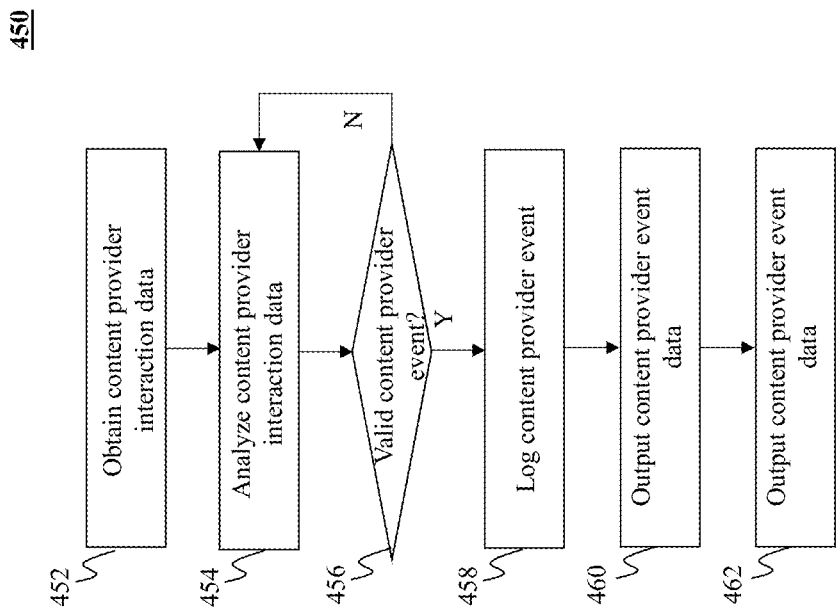
FIG. 4B is an illustrative flowchart of an exemplary process for generating and outputting content provider event data, in accordance with various embodiments of the present teaching.

FIG. 4B is an illustrative flowchart of an exemplary process for generating and outputting content provider event data, in accordance with various embodiments of the present teaching. Process 450, in a non-limiting embodiment, may begin at step 452. At step 452, content provider interaction data may be obtained. For instance, content provider interaction data may be obtained from content provider interaction database 170 by content provider interaction data receiver 412. In some embodiments, the content provider interaction data may be obtained in response to a request being sent from interaction data collection initiator 410, which may be a result of timer 418 notifying interaction data collection initiator 410 that a predefined temporal duration has elapsed.

At step 454, the content provider interaction data may be analyzed. For instance, content provider interaction data analyzer 414 may analyze the content provider interaction data. In some embodiments, content provider interaction data analyzer 414 may employ interaction data features 422 to determine a list of events that were detected for each user device 110 by each content provider 130. A step 456, a determination may be made as to whether each content provider event included within the list of events is valid. For instance, interaction validity determiner 416 may employ validity models 424 to determine whether each event from the list is to be used for determining/performing an analysis of click fraud.

If, at step 456, it is determined that a particular content provider event is not valid, then process 450 may return to step 454. In this particular scenario, a subsequent event from the list of events may be analyzed and process 450 may return to step 456 where a new determination is made as to whether the new subsequent event is valid. This loop (e.g., steps 454, 456) may repeat for each content provider event included within the list of events. If, however, at step 456 it is determined that the content provider event is a valid content provider event, then process 450 may proceed to step 458. At step 458, the valid content provider event may be logged. For example, the valid content provider event may be logged in content provider event log 426.

At step 460, content provider event data may be generated. For example, interaction validity determiner 416 may be configured to generate content provider event data representing one or more of the valid content provider events that have been identified. At step 462, the content provider event data may be output. For example, the content provider event data may be provide to risk determination system 214.

Figure 5A:
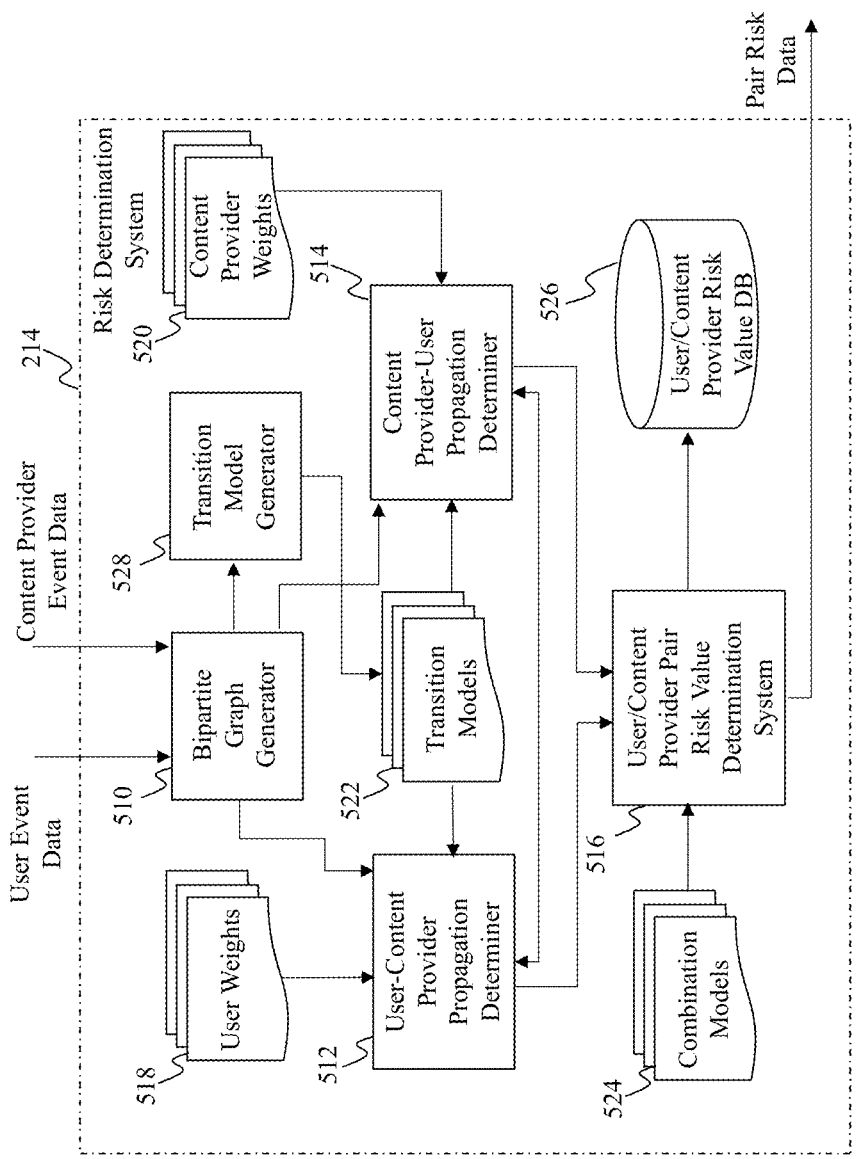
FIG. 5A is an illustrative diagram of an exemplary risk determination system, in accordance with various embodiments of the present teaching.

FIG. 5A is an illustrative diagram of an exemplary risk determination system, in accordance with various embodiments of the present teaching. Risk determination system 214, in the illustrative embodiment, includes a bipartite graph generator 510, a transition model generator 528, a user-content provider propagation determiner 512, a content provider-user propagation determiner 514, a user/content provider pair risk value determination system 516, and a user/content provider risk value database 526. In some embodiments, risk determination system 214 may implement one or more computer programs stored within memory using one or more processors in order to perform the functions associated with bipartite graph generator 510, transition model generator 528, user-content provider propagation determiner 512, content provider-user propagation determiner 514, and user/content provider pair risk value determination system 516.

Bipartite graph generator 510, in one embodiment, may be configured to generate one or more bipartite graphs and/or data representing bipartite graph information. The bipartite graph may indicate a relationship between user devices 110 and content providers 130, which may assist in identifying fraudulent user device-content provider pairs. For a given set of N content providers, represented by $V_{CP} = \{CP_i\}_{i=1}^{N}$, and M user devices, represented by $V_{UD} = \{UD_j\}_{j=1}^{N}$, a bipartite graph may be generated and represented by Equation 1:

$$G=(V_{CP}, V_{UD}, C) \quad \text{Equation 1.}$$

In Equation 1, C corresponds to relational data indicating interaction relationships between each user device and each content provider. For example, the relational data may refer to a transition matrix, represented by $C=[C_{ij}]_{n \times m}$. In this particular scenario, $C_{ij}$ corresponds to a number of interaction events (e.g., clicks) detected by the i-th content provider from the j-th user device. In one embodiment, user devices 110 may be tracked by one or more identifies. Various identifiers that may be employed for tracking include, but are not limited to, IP addresses, user agent strings, device identifiers, serial numbers, telephone numbers, GPS locations, social media network identifies, and the like. The transitional data may, in some embodiments, be obtained from transition model generator 528.

Bipartite graph generator 510, in one example, may generate risk measure bipartite graphs. In one embodiment, the bipartite graph that is generated may include user device identifiers (e.g., IP addresses) and content provider identifiers (e.g., URLs). Each user device identifier is connected to a corresponding content provider identifier or identifiers with a transition probability. The transition probabilities, in this particular instance, may be used to generate weighted user-content provider transition matrix $W^{UD,CP}(i,j)$, as described below by Equation 2. The greater the transition probability, the more suspicious the pair of user device and content provider are. In one embodiment, content provider identifiers determined to have an increased number of user device identifiers with which are connected thereto may cause that content provider risk value to be "boosted" (e.g., weighted greater) as compared to other content providers.

In response to generating the aforementioned bipartite graph illustrating the propagation of user devices to content providers, another bipartite graph may be generated that illustrates the propagation of content providers to user devices. In this embodiment, the content provider identifiers are mapped to the user device identifiers with transition probabilities, indicating the suspicious level. The transition probabilities, in this particular instance, may be used to generate weighted content provider-user transition matrix $W^{CP,UD}(i,j)$, as described below by Equation 3. Based on the analysis of the content providers with which increased suspicious was detected, user devices that interact with those content providers may have their risk value "boosted." Therefore, the dependency between content provider and user device may reflect the level of suspicion, and thus risk, of both the content provider, the user device, and the pair.

User-content provider propagation determiner 512, in some embodiments, may be configured to determine a representation of a user risk value. To determine the representation of the user risk value, user-content provider propagation determiner 512 may, amongst other aspects, determine an initial user risk value and a weighted translational data associated with user to content provider transitions reflected by the relational data, as well as obtain a representation of a content provider risk value from content provider-user propagation determiner 514.

Content provider-user propagation determiner 514, in some embodiments, may be configured to determine a representation of a content provider risk value. To determine the representation of the content provider risk value, content provider-user propagation determiner 514 may, amongst other aspects, determine an initial content provider risk value and weighted translation data associated with content provider to user transitions reflected by the relational data, as well as obtain the representation of the user risk value from user-content provider propagation determiner 512.

Persons of ordinary skill in the art will recognize that although risk determination system 214 include a separate user-content provider propagation determiner 512 and a separate content provider-user propagation determiner 514, in some embodiments, a single propagation determiner may be employed. The use of both user-content provider propagation determiner 512 and content provider-user propagation determiner 514 within FIG. 5A is merely illustrative.

In some embodiments, the determination of the user risk value and the content provider risk value may be accomplished through one or more iterative processes. Both user-content provider propagation determiner 512 and content provider-user propagation determiner 514 may include one or more computer programs executable using one or more processors associated with risk determination system 214 to perform the iterations and determine the user risk value and the content provider risk value. In a non-limiting embodiment, the content provider risk value and the user risk value for the i-th content provider and the j-th user device at iteration t may be represented by $s_{CP}^{t}(i)$ and $s_{UD}^{t}(j)$, respectively. Furthermore, the content provider risk value and the user risk value for all content providers 130 and user devices 110 may be represented by $s_{CP}^t = [s_{CP}^t(i)]_{N \times 1}$ and $s_{UD}^t = [s_{UD}^t(j)]_{m \times 1}$, respectively.

Transition model generator 528 may be further configured to generate one or more transition models 522 (e.g., transition matrix $C_{ij}$). The one or more transition models 522 may be employed by user-content provider propagation determiner 512, in one embodiment, to generate weighted user-content provider relational data based on the relational data and one or more user weights 518. For instance, the weighted user-content provider relational data may correspond to a weighted user-content provider transition matrix, $W^{UD,CP}(i,j)$. For example, weighted user-content provider transition matrix $W^{UD,CP}(i,j)$ may be calculated by normalizing the transition matrix $C_{ij}$ for user device to content provider transitions, as described by Equation 2:

$$W^{UD,CP}(i, j) = \frac{C(i, j)}{\sum_{j'} C(i, j')}. \qquad \text{Equation 2}$$

Similarly, transition model generator 528 may be configured to generate one or more transition models 522 (e.g., transition matrix $C_{ji}$). The one or more transition models 522 may be employed by content provider-user propagation determiner 514, in one embodiment, to generate weighted content provider-user relational data based on the relational data and one or more content provider weights 520. For instance, the weighted content provider-user relational data may correspond to a weighted content provider-user transition matrix, $W_{CP,UD}(i,j)$. For example, weighted content provider-user transition matrix $W^{CP,UD}(i,j)$ may be calculated by normalizing the transition matrix $C_{ij}$ for content provider to user device transitions, as described by Equation 3:

$$W^{CP,UD}(i, j) = \frac{C(j, i)}{\sum_{j'} C(j', i)}. \qquad \text{Equation 3}$$

In Equation 2, i corresponds to the i-th content provider, while j corresponds to the j-th user device. In Equation 3, however, j corresponds to the j-th content provider and i corresponds to the i-th user device. When normalizing transition matrix C for transitions from user devices to content providers, transition matrix C may be normalized row by row, and then divided by the sum over the columns. However, when normalizing transition matrix C for transitions from content providers to user devices, the transpose of C (e.g., $C^T$) is employed, and then normalized.

Using $W^{UD,CP}(i,j)$ and $W^{CP,UD}(i,j)$, a representation of the content provider risk value and the user risk value may be determined. The representations may be described by Equations 4 and 5, respectively:

$$s_{CP}^{t+1} = \alpha W_{UD,CP} s_{UD}^t + (1-\alpha) v_{CP} \qquad \text{Equation 4.}$$

$$s_{UD}^{t+1} = \alpha W^{CP,UD} s_{CP}^t + (1-\alpha) v_{UD} \qquad \text{Equation 5.}$$

In Equations 4 and 5, a is a number between 0 and 1, and $v_{CP}$ and $v_{UD}$ are the initial content provider risk value and initial user risk value, respectively. In one embodiment, the initial content provider risk value may be set as the content provider CTR (e.g., $v_{CP} = CTR_{CP}$), while the initial user risk value may be set as the user device CTR (e.g., $V_{UD} = CTR_{UD}$). The content provider CTR and the user device CTR may be obtained from content provider interaction determiner 212 and user interaction determiner 210, respectively, as described above. User-content provider propagation determiner 512 and content provider-user propagation determiner 514 may be configured to communicate with one another to obtain representations of the content provider risk value and the user device risk value, respectively. By doing so, the iterative process, as described below with relation to user/content provider pair risk value determination system 516 may be performed. Furthermore, in one embodiment, user-content provider propagation determiner 512 and content provider-user propagation determiner 514 may be combined into a single module/system.

Configure user/content provider pair risk value determination system 516 may, in some embodiments, to execute one or more computer programs via one or more processors associated with risk determination system 520 to determine a user-content provider pair risk value. Using the user CTR value and the content provider CTR value as the values for $v_{CP}$ and $v_{UD}$, system 516 may perform iterations (e.g., t=0, 1, 2, . . . , w) until Equations 4 and 5 converge. In response to Equations 4 and 5 converging, a converged content provider risk value $s_{CP}(i)$ for each content provider and a converged user risk value $s_{UD}(j)$ for each user device may be determined. The converged user risk value and the converged content provider risk value may then be combined to formulate a user-content provider pair risk value $s_{CP,UD}(i,j)$. The user-content provider pair risk value, which may also be referred to herein as the pair risk value, may be described by Equation 6:

$$s_{CP,UD}(i, j) = s_{CP}(i) \frac{C(i, j)}{\sum_{j'} C(i, j')} + s_{UD}(j) \frac{C(j, i)}{\sum_{i'} C(i', j)}. \qquad \text{Equation 6}$$

In some embodiments, system 516 may employ one or more combination models 524 to identify a combinatory technique, or approach to combine, the converged user risk value and the converged content provider risk value. In some embodiments, difference combinations of the converged user risk value and the converged content provider risk value may be employed. For example, as seen below, the converged user risk value and content provider risk value may be used with an exponential function:

$$s_{CP,UD}(i, j) = e^{s_{CP}(i)} \frac{C(i, j)}{\sum_{j'} C(i, j')} + e^{s_{UD}(j)} \frac{C(j, i)}{\sum_{i'} C(i', j)}.$$

Upon determination of the pair risk value, system 516 may be configured to provide the pair risk value to user/content provider risk value database 526. User/content provider risk value database 526 may store, for each user device-content provider pair, a corresponding pair risk value. This may allow for risk determination system 140 to track which pairs of content providers and users currently have displayed fraudulent activity, and which pairs now have become fraudulent. Furthermore, system 516 may be configured to output the pair risk value (e.g., the representation of pair risk value seen in Equation 6) to user/content provider suspension system 216.

Figure 5B:
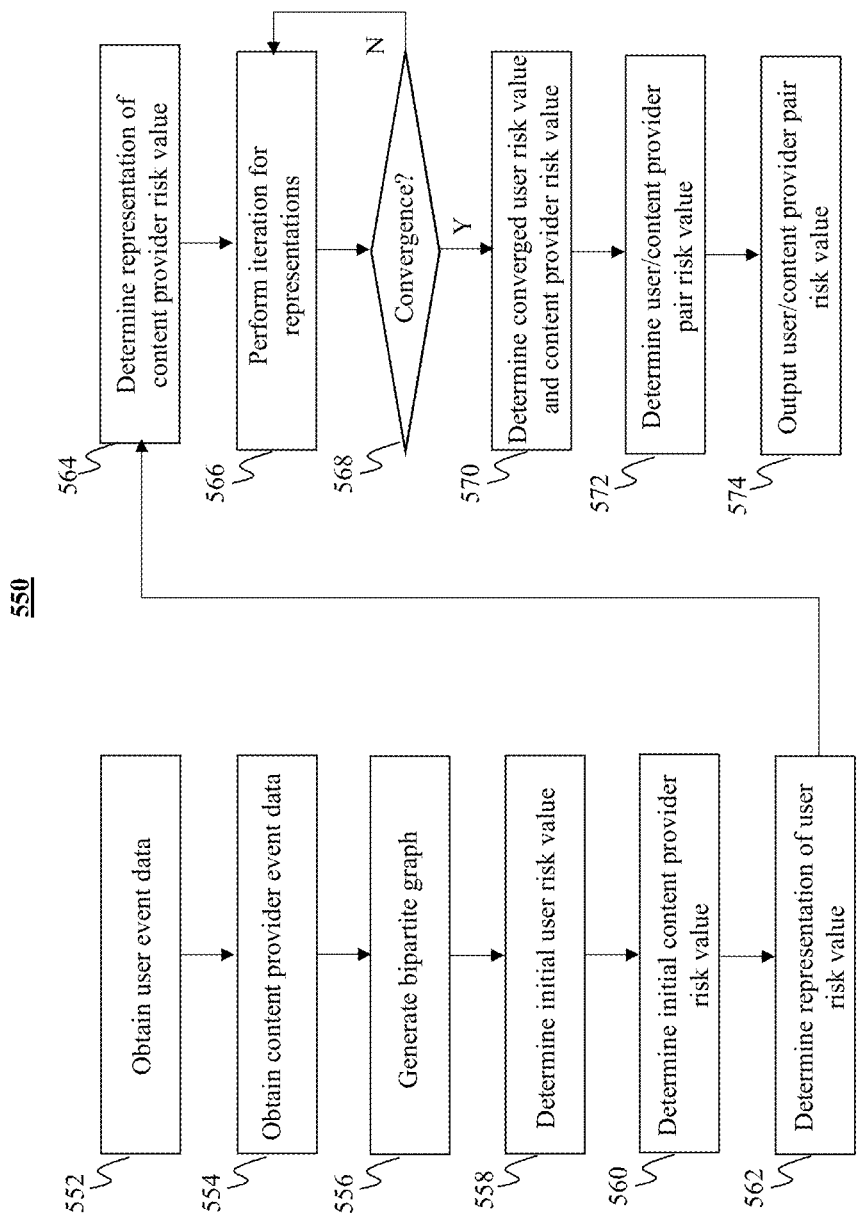
FIG. 5B is an illustrative flowchart of an exemplary process for determining a user/content provider risk value, in accordance with various embodiments of the present teachings.

FIG. 5B is an illustrative flowchart of an exemplary process for determining a user/content provider risk value, in accordance with various embodiments of the present teachings. Process 550, in a non-limiting embodiment, may begin at step 552. At step 552, user event data may be obtained. For instance, user event data may be obtained from user interaction determiner 210. At step 554, content provider event data may be obtained. For example, content provider event data may be obtained from content provider interaction determiner 212. At step 556, one or more bipartite graphs may be generated. For example, bipartite graph generator 510 may receive the user event data and the content provider event data, and may generate one or more bipartite graphs, representations of one or more bipartite graphs, and/or data representing one or more bipartite graphs.

At step 558, an initial user risk value may be determined. For instance, user-content provider propagation determiner 512 may be configured to determine, based at least in part on the user event data, an initial risk value associated with each user device 110. In one embodiment, the initial user risk value may correspond to a CTR associated with each user device. At step 560, an initial content provider risk value may be determined. For instance, content provider-user propagation determiner 514 may be configured to determine, based at least in part on the content provider event data, an initial risk value associated with each content provider 130. In one embodiment, the initial content provider risk value may correspond to a CTR associated with each content provider.

At step 562, a representation of the user risk value may be determined. For instance, user-content provider propagation determiner 512 may determine the representation of the user risk value. At step 564, a representation of the content provider risk value may be determined. For instance, content provider-user propagation determiner 514 may determine the representation of the content provider risk value. In some embodiments, steps 562 and 564 may occur together such that the representation of the user risk value and the representation of the content provider risk value or co-dependent. For example, representations of the content provider risk value and the user risk value may be described by Equations 4 and 5 above. In Equations 4 and 5, the representation of the content provider risk value at iteration t+1 is dependent on the representation of the user device risk value at iteration t and the initial content provider risk value, amongst other features, while the representation of the user risk value at iteration t+1 is dependent on the representation of the content provider risk value at iteration t and the initial user risk value, amongst other features.

At step 566, an iterative process may be performed for the representations. For instance, user/content provider pair risk value determination system 516 may perform the iterations. For example, a content provider risk value and a user risk value at iteration t=0, t=1, t=2, etc., may be calculated using Equations 4 and 5. At step 568, a determination may be made as to whether the representations of the user risk value and the content provider risk value converge. If so, then process 550 may proceed to step 570. If not, then process 550 may return to step 566 where the iterations continue.

At step 570, the converged content provider risk value and the converged user risk value may be determined. At step 572, a user/content provider pair risk value may be determined. In some embodiments, user/content provider pair risk value determination system 516 may employ one or more combination models 524 to determine the user/content provider pair risk value. For example, as described above by Equation 6, the converged content provider risk value and the converged user risk value may be employed to determine the user/content provider pair risk value. At step 574, the user/content provider pair risk value may output by risk determination system 214. In some embodiments, the output user/content provider pair risk value may be provided to user/content provider suspension system 216. Alternatively or additionally, the user/content provider pair risk value may be provided to user/content provider risk value database 526 to be stored.

Figure 6A:
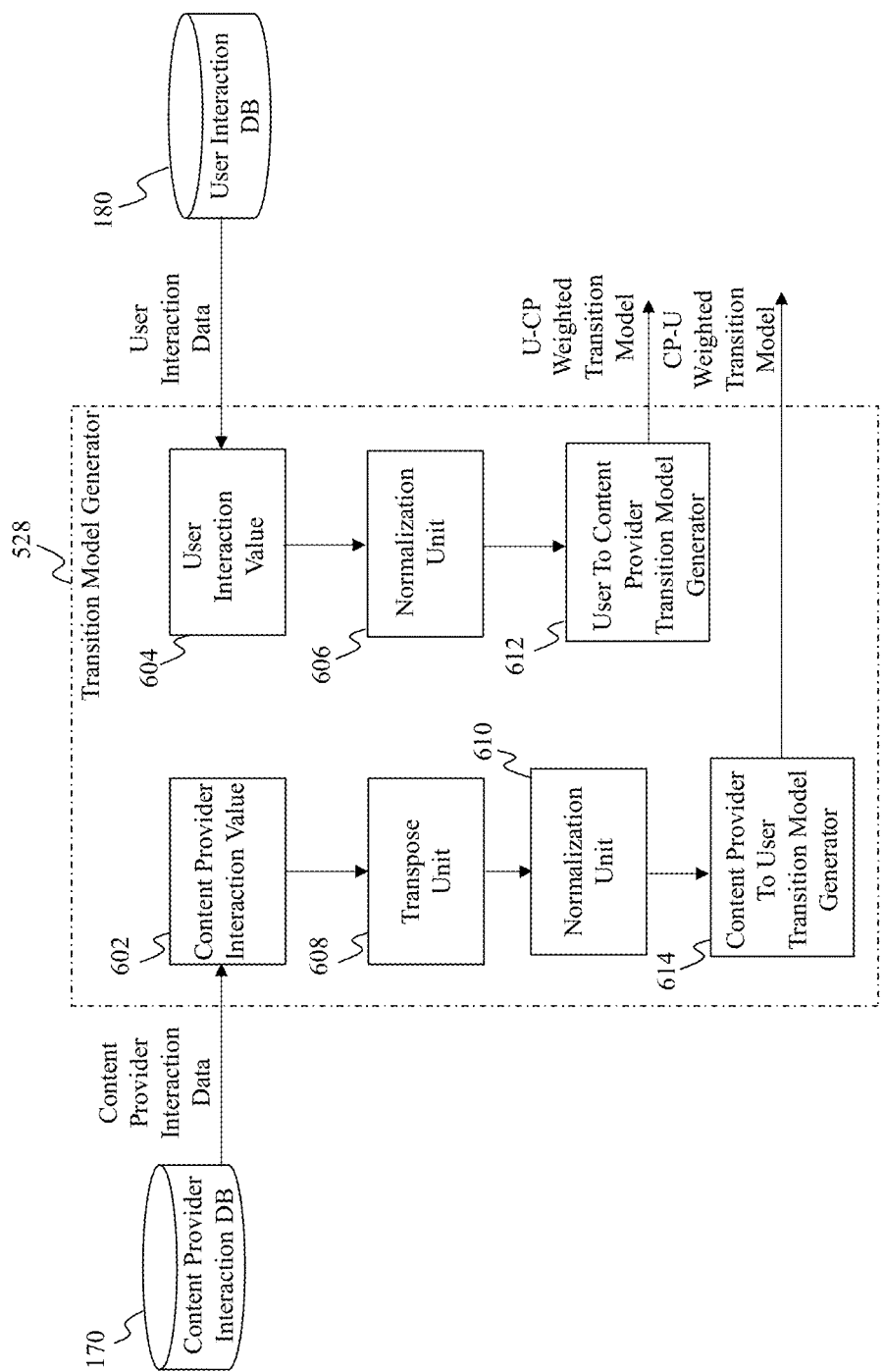
FIG. 6A is an illustrative diagram of an exemplary transition model generator, in accordance with various embodiments of the present teaching.

FIG. 6A is an illustrative diagram of an exemplary transition model generator, in accordance with various embodiments of the present teaching. Transition model generator, in the illustrative embodiment, may include a content provider interaction obtainer 602, a user interaction value obtainer 604, normalization units 606 and 610, a transpose unit 608, a user to content provider transition model generator 612, and a content provider to user transition model generator 614. In some embodiments, transition model generator 528 may implement one or more computer programs stored within memory using one or more processors in order to perform the functions associated with content provider interaction obtainer 602, user interaction value obtainer 604, normalization units 606 and 610, transpose unit 608, user to content provider transition model generator 612, and content provider to user transition model generator 614.

Content provider interaction value obtainer 602 may, in some embodiments, be configured to obtain content provider interaction data from content provider interaction database 170. The content provider interaction data may indicate interactions between content providers and users. For example, the content provider interaction data may indicate transitions of matrix C from content provider to user device. User interaction value obtainer 604, in some embodiments, may be configured to obtain user interaction data from user interaction database 180. The user interaction data may indicate interactions between users and content providers. For example, the user interaction data may indicate transitions of matrix C from user device to content provider.

Normalization unit 606 may be configured to normalize transition matrix C for user device to content provider transitions. For example, as seen in Equation 2, each row of matrix C(i,j) may be normalized by dividing over the sum of different columns. Normalization unit 610 may operate in a substantially similar manner. However, prior to normalization unit 610 performing the normalization to transition matrix C(j,i), transpose unit 608 may be configured to obtain the matrix transpose of C(i,j). Matrix C is not a symmetric square matrix, and so therefore the transpose of the matrix from user device-content provider to content provider-user device may first be performed. The result, as seen by Equation 7, is then normalized by normalization unit 610:

$$W^{CP,UD}(i,j) := \frac{C^T(i,j)}{\sum_{j'} C^T(i,j')} = \frac{C(j,i)}{\sum_{j'} C(j',i)}. \qquad \text{Equation 7}$$

User to content provider transition model 612 may be configured to obtain the normalized transition matrix, and output the weighted transition matrix $W^{UD,CP}(i,j)$. For instance, transition model generator 528 may output the weighted transition matrix to user weights 518 and/or transition models 522, which may then be employed by user-content provider propagation determiner 512. Similarly, content provider to user transition model generator 614 may be configured to obtain the normalized transition matrix for content provider to user device transitions, and may output the weighted transition matrix $W^{CP,UD}(i,j)$. For instance, transition model generator 528 may output the weighted transition matrix to content provider weights 520 and/or transition models 522, which may then be employed by content provider-user propagation determiner 514.

Figure 6B:
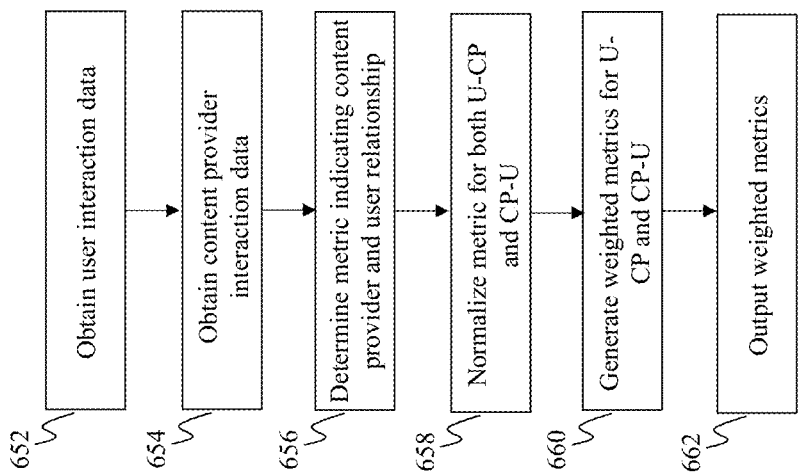
FIG. 6B is an illustrative flowchart of an exemplary process for determining one or more transition metrics, in accordance with various embodiments of the present teaching.

FIG. 6B is an illustrative flowchart of an exemplary process for determining one or more transition metrics, in accordance with various embodiments of the present teaching. Process 650, in a non-limiting embodiment, may begin at step 652. At step 652, user interaction data may be obtained. For instance, user interaction data may be obtained by user interaction value obtainer 604 from user interaction database 180. At step 654, content provider interaction data may be obtained. For instance, content provider interaction data may be obtained by content provider interaction value obtainer 602 from content provider interaction database 170.

At step 656, a matrix indicating content provider and user relationship may be determined. For example, user interaction value obtainer 604 and content provider interaction value obtainer 602 may determine matrix C. At step 658, the metric for user device to content provider transitions and the matrix for content provider to user device transitions may be normalized. For example, normalization unit 606 may normalize matrix C for user device to content provider transitions. For content provider to user device transitions, transpose unit 608 may first generate the transpose matrix of C, $C^T$, which may then be provided to normalization unit 610 for normalization. At step 660, weighted transition matrices $W^{UD,CD}(i,j)$ and $W^{CP,UD}(i,j)$ may be generated. For example, user to content provider transition model generator 612 may generate the user device to content provider (U-CP) weighted transition model $W^{UD,CD}(i,j)$, while content provider to user device transition model generator 614 may generate the content provider to user device (CP-U) weighted transition model $W^{CP,UD}(i,j)$. At step 662, the weighted matrices may be output. For example, the weighted matrices $W^{UD,CD}(i,j)$ and $W^{CP,UD}(i,j)$ may be output to user weights 518 and content provider weights 520, respectively, as well as, or alternatively, transition models 522.

Figure 7A:
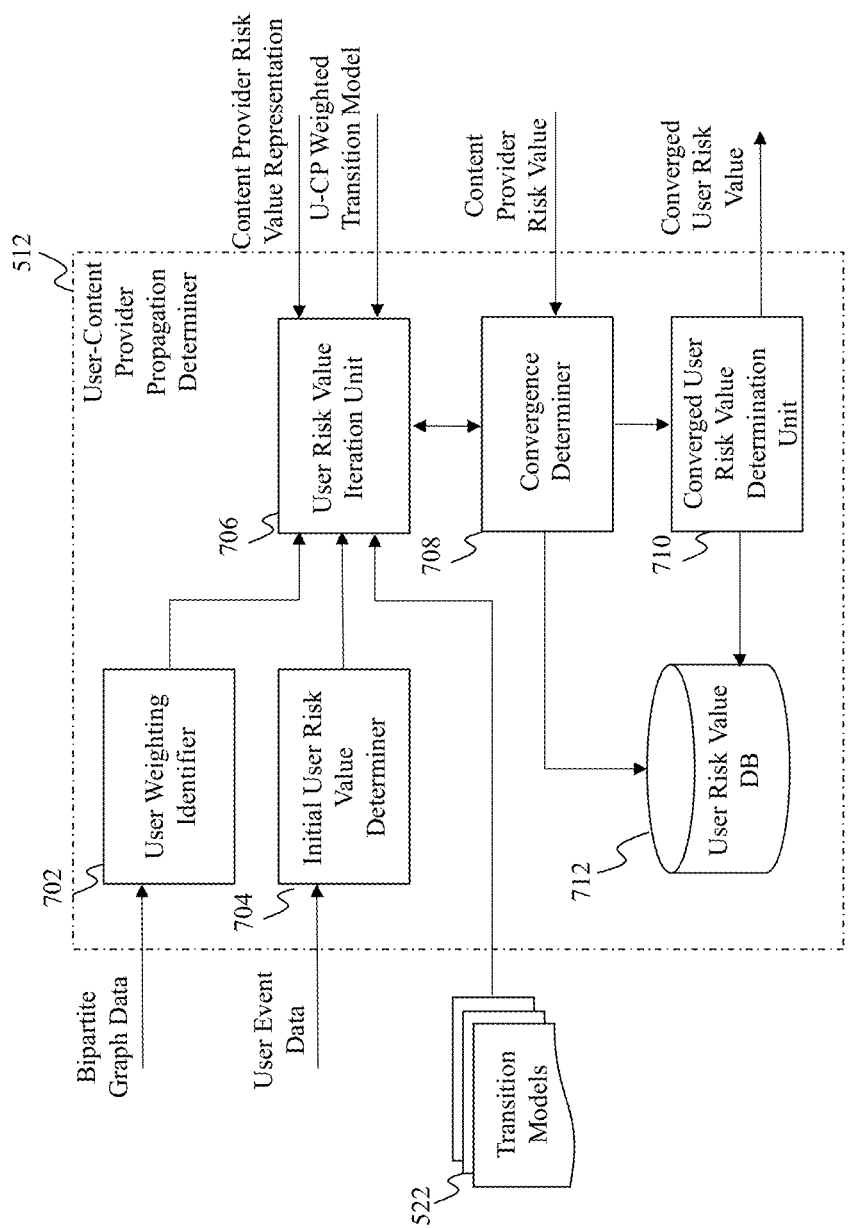
FIG. 7A is an illustrative diagram of an exemplary a user-content provider propagation determiner, in accordance with various embodiments of the present teaching.

FIG. 7A is an illustrative diagram of an exemplary a user-content provider propagation determiner, in accordance with various embodiments of the present teaching. User-content provider propagation determiner 512, in the illustrative embodiment, includes a user weighting identifier 702, an initial user risk value determiner 704, a user risk value iteration unit 706, a convergence determiner 708, a converged user risk value determination unit 710, and a user risk value database 712. In some embodiments, user-content provider propagation determiner 512 may implement one or more computer programs stored within memory using one or more processors in order to perform the functions associated with user weighting identifier 702, initial user risk value determiner 704, user risk value iteration unit 706, convergence determiner 708, and converged user risk value determination unit 710.

User weighting identifier 702, in one embodiment, may be configured to receive bipartite graph data from bipartite graph generator 510. The bipartite graph data may indicate a transition probability for identifiers associated with user devices 110, such as IP addresses associated with user devices 110, interacting with various content providers 130. For example, the transition probability for user device 1 to interact with content rendered by content provider A may be TP 1. The transition probability—which indicates a frequency with which a suspicious, or risky, user device visits a content provider—for user device 2 to interact with the content rendered by content provider A may by TP 2. If TP 1 is greater than TP 2, then user weighting identifier 702 may apply a boost to risk value associated with content provider A. This process may be similarly applied to all of the content providers 130, thereby generating a ranked list of content providers based on their risk value. In other words, the risk value of a particular user device may influence the risk value of a content provider. The various information about which user devices are to be "boosted," (e.g., weighted more heavily) may be provided to user risk value iteration unit 706.

Initial user risk value determiner 704 may be configured to receive user event data from user interaction determiner 210. As described above, the user event data may indicate interactions between a user and the content provided by each content provider 130. In some embodiments, initial user risk value determiner 704 may be configured to determine an initial user risk value based on the user event data. For example, the user event data may include a user CTR, or the user CTR may be computed by initial user risk value determiner 704. In either of these scenarios, initial user risk value determiner 704 may be determine and/or select the value to be used for the initial user risk value, such as using the user CTR as the initial user risk value. Initial user risk value determiner 704 may provide the initial user risk value to user risk value iteration unit 706.

User risk value iteration unit 706 may be configured, in one embodiment, to obtain the weight information from user weighting identifier 702, the initial user risk value from initial user risk value determiner 704, as well as the user device to content provider weighted transition model $W^{UD,CD}(i,j)$ from transition model generator 528 and the content provider risk value representation from content provider-user propagation determiner 514. User risk value iteration unit 706 may be configured to generate a representation of the user risk using transition models 522 and the aforementioned obtained/received information. In one embodiment, the representation of the user risk value may correspond to Equation 5. In some embodiments, as mentioned above, the representation of the content provider risk value may be obtained from content provider-user propagation determiner 514. As seen by Equation 5, the representation of the user risk value at iteration t+1 may need the representation of the content provider risk value at iteration t in order to perform the iterations. User risk value iteration unit 706 may be configured to begin performing the iterations, and determining user risk values at each iteration. The user risk values may then be output to convergence determiner 708.

Convergence determiner 708 may be configured, in one embodiment, to determine whether the user risk value at iteration t (as well as the content provider risk value at iteration t) converges. In some embodiments, convergence may correspond to when the representation of the e user risk value no longer change from iteration t to iteration t+1. For example, a representation may be said to converge when that representation satisfies a convergence condition. One exemplary convergence condition may be described by Equation 8:

$$|s_{UD}^{t+1} - s_{UD}^t| < \varepsilon \qquad \text{Equation 8.}$$

In Equation 8, ε corresponds to a pre-defined value. For example, ε may be equal to $10^{-6}$. When the representations of the user risk value does not change from iteration t to t+1 by more than ε then the representation may be said to have converged.

Converged user risk value determination unit 710 may be configured to identify the user risk value that convergence is reached for, and output the converged user risk value. In some embodiments, the converged user risk value may be provided to user/content provider pair risk value determination system 516. In some embodiments, the converged user risk value may further be stored within user risk value database 712 so that each converged user risk value for each user device-content provider pair is stored.

Figure 7B:
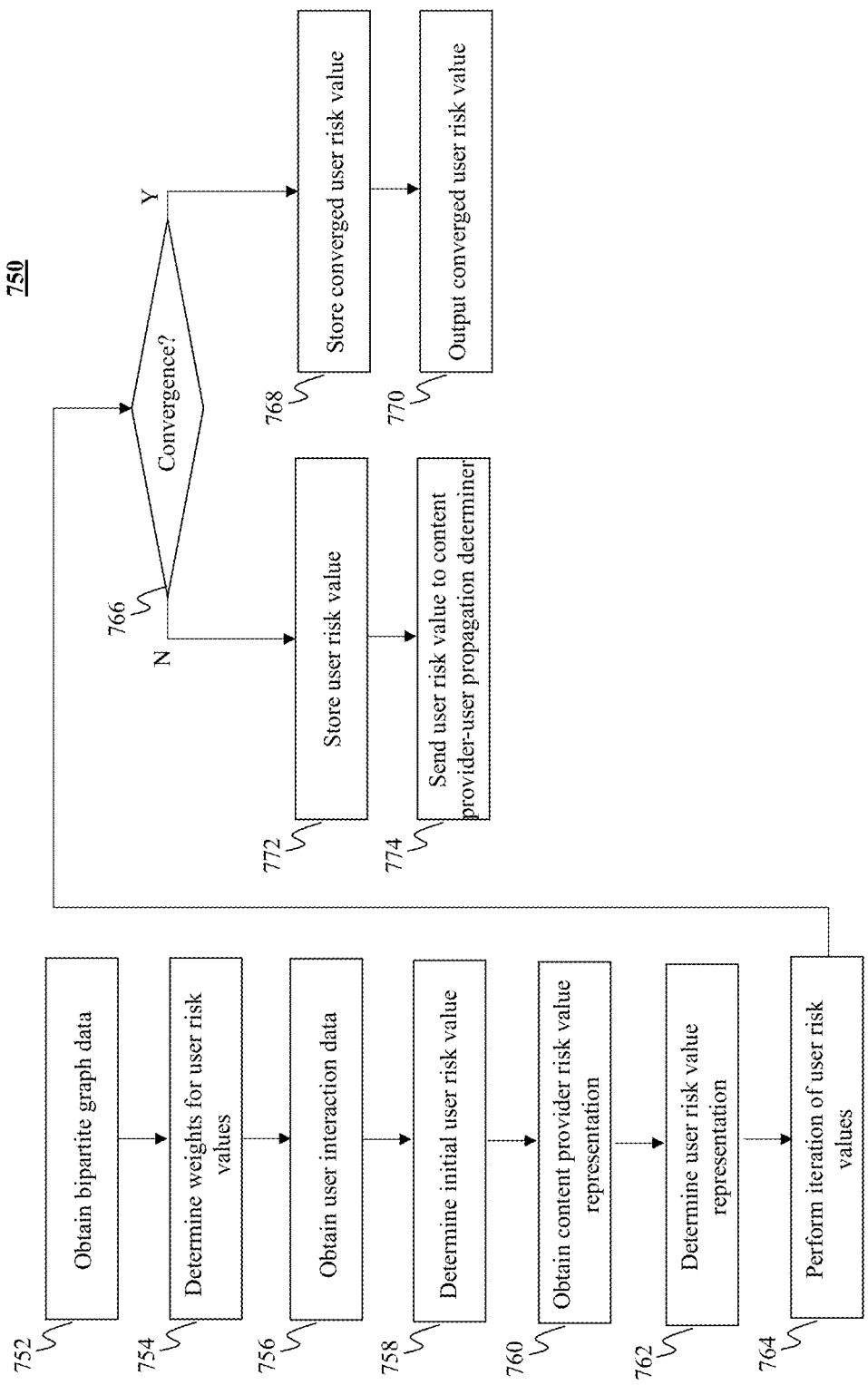
FIG. 7B is an illustrative flowchart of an exemplary process for determining and outputting a converged user risk value, in accordance with various embodiments of the present teaching.

FIG. 7B is an illustrative flowchart of an exemplary process for determining and outputting a converged user risk value, in accordance with various embodiments of the present teaching. Process 750, in a non-limiting embodiment, may begin at step 752. At step 752, bipartite graph data may be obtained. For instance, bipartite graph data generated by bipartite graph generator 510 may be obtained by user weighting identifier 702. At step 754, weights for the user risk values may be determined. For example, user weighting identifier 702 may determine, based at least in part on the bipartite graph data, one or more weights to be applied to the user risk values for the transition matrix of user devices to content providers.

At step 756, user interaction data may be obtained. For instance, the user interaction data may be obtained by initial user risk value determiner 704 from user interaction determiner 210. At step 758, the initial user risk value may be determined. For instance, initial user risk value determiner 704 may determine, based at least in part on the user event data, an initial user risk value. For example, the initial user risk value may correspond to the user CTR.

At step 760, the content provider risk value representation may be obtained. For instance, user risk value iteration unit may receive the representation of the content provider risk value from content provider-user propagation determiner 514. Furthermore, user risk value iteration unit 706 may obtain the user to content provider weighted transition model $W^{UD,CD}(i,j)$ from transition models 522. At step 762, the user risk value representation may be determined. In some embodiments, the user risk value representation may be described by Equation 5. At step 764, the iteration process of the user risk value (and the content provider risk value) may be performed. For instance, Equation 5 (and Equation 4) may be iterated from iteration t=0 to t=1, t=1 to t=2, etc. At step 766, a determination may be made as to whether the representation of the user risk value converges. For instance, convergence determiner 708 may be employed to determine whether convergence has been reached. In some embodiments, steps 760-766 of process 750 may be performed in parallel with steps 860-866 of process 850, as described below.

If, at step 766, it is determined that convergence has been reached, then process 750 may proceed to step 768. At step 768, the converged user risk value (e.g., the user risk value determined by Equation 5 when convergence is reached) may be stored. For instance, converged user risk value determination unit 710 may determine the converged user risk value, and may provide the converged user risk value to user risk value database 712 to be stored. At step 770, the converged user risk value may be output. For instance, converged user risk value determination unit 710 may output the converged user risk value to user/content provider pair risk value determination system 516.

If, however, at step 766, it is determined that convergence has not been reached, then process 750 proceed to step 772. At step 772, the user risk value determined from the most recent iteration may be stored. For instance, convergence determiner 708 may provide the user risk value to user risk value database 712 to be stored. At step 774, the user risk value may be sent to content provider-user propagation determiner 514. In this particular scenario, the iterated user risk value may be employed by content provider-user propagation determiner 514 to perform a subsequent iteration. Furthermore, in this particular scenario, the most recent iterated content provider risk value may further be obtained and provided to convergence determiner 708 for subsequent iterations.

Figure 8A:
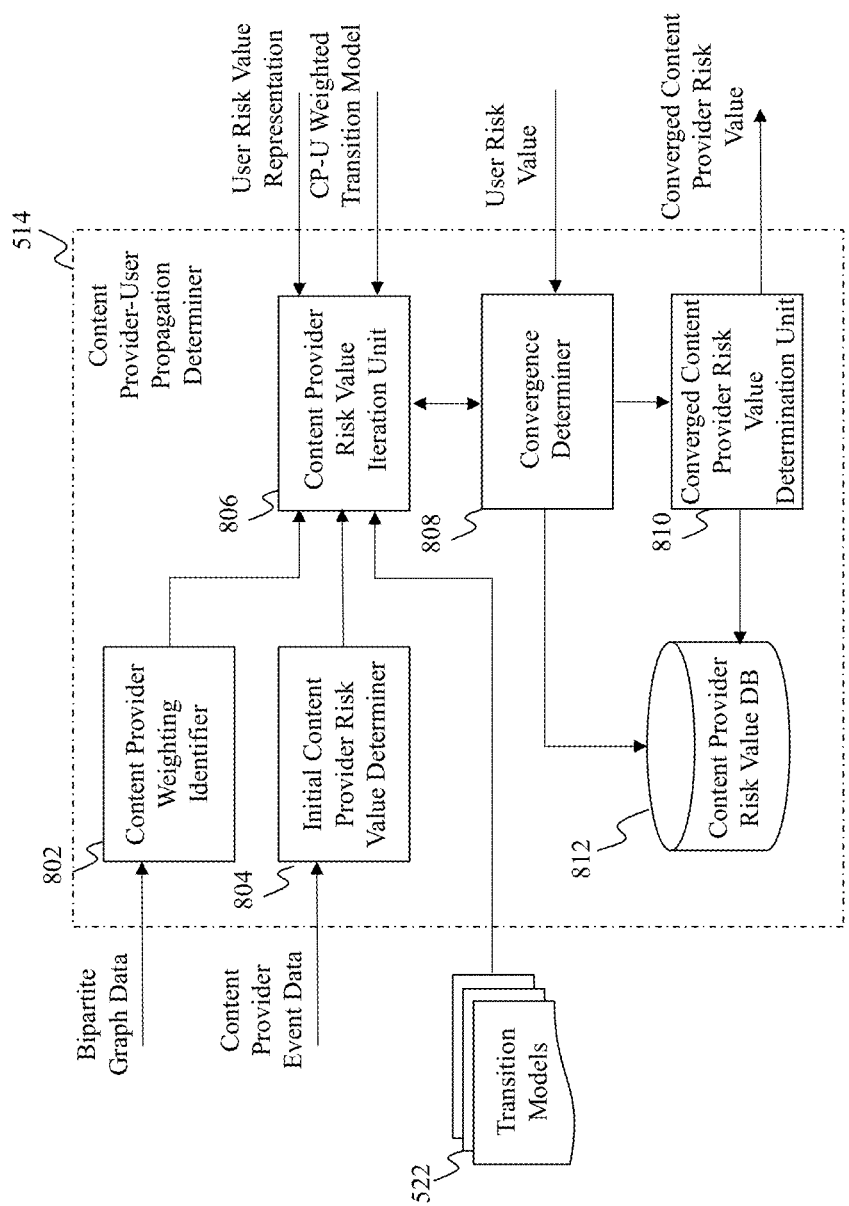
FIG. 8A is an illustrative diagram of an exemplary a content provider-user propagation determiner, in accordance with various embodiments of the present teaching.

FIG. 8A is an illustrative diagram of an exemplary a content provider-user propagation determiner, in accordance with various embodiments of the present teaching. Content provider-user propagation determiner 514, in the illustrative embodiment, includes a content provider weighting identifier 802, an initial content provider risk value determiner 804, a content provider risk value iteration unit 806, a convergence determiner 808, a converged content provider risk value determination unit 810, and a content provider risk value database 712. In some embodiments, content provider-user propagation determiner 514 may implement one or more computer programs stored within memory using one or more processors in order to perform the functions associated with content provider weighting identifier 802, initial content provider risk value determiner 804, content provider risk value iteration unit 806, convergence determiner 808, and converged content provider risk value determination unit 810.

Content provider weighting identifier 802, in one embodiment, may be configured to receive bipartite graph data from bipartite graph generator 510. The bipartite graph data may indicate a transition probability for various content providers 130 that have detected interactions from one or more user devices 110. For example, the transition probability for content provider A to detect interactions from user device 1 may be TP 1. The transition probability—which indicates a frequency with which a suspicious, or risky, content provider receives visits from a user device—for content provider A to have content rendered thereby be interacted with by a second user device 2 may by TP 2. If TP 1 is greater than TP 2, then content provider weighting identifier 802 may apply a boost to risk value associated with that user device's identifier (e.g., an IP address associated with user device 1). This process may be similarly applied to all of the user devices 110, thereby generating a ranked list of user devices based on their risk value. In other words, the risk value of a particular content provider may influence the risk value of a user device. The various information about which content providers are to be "boosted," (e.g., weighted more heavily) may be provided to content provider risk value iteration unit 806.

Initial content provider risk value determiner 804 may be configured to receive content provider event data from content provider interaction determiner 212. As described above, the content provider event data may indicate interactions with content rendered by a content provider from a user device. In some embodiments, initial content provider risk value determiner 804 may be configured to determine an initial content provider risk value based on the content provider event data. For example, the content provider event data may include a content provider CTR, or the content provider CTR may be computed by initial content provider risk value determiner 804. In either of these scenarios, initial content provider risk value determiner 804 may be determine and/or select the value to be used for the initial content provider risk value, such as using the content provider CTR as the initial content provider risk value. Initial content provider risk value determiner 804 may provide the initial content provider risk value to content provider risk value iteration unit 806.

Content provider risk value iteration unit 806 may be configured, in one embodiment, to obtain the weight information from content provider weighting identifier 802, the initial content provider risk value from initial content provider risk value determiner 804, as well as the content provider to user device weighted transition model $W^{CD,UD}$ (i,j) from transition model generator 528 and the user risk value representation from user-content provider propagation determiner 512. Content provider risk value iteration unit 806 may be configured to generate a representation of the content provider risk using transition models 522 and the aforementioned obtained/received information. In one embodiment, the representation of the content provider risk value may correspond to Equation 4. In some embodiments, as mentioned above, the representation of the user risk value may be obtained from user-content provider propagation determiner 512. As seen by Equation 4, the representation of the content provider risk value at iteration t+1 may need the representation of the user risk value at iteration t in order to perform the iterations. Content provider risk value iteration unit 806 may be configured to begin performing the iterations, and determining content provider risk values at each iteration. The content provider risk values may then be output to convergence determiner 808.

Convergence determiner 808 may be configured, in one embodiment, to determine whether the content provider risk value at iteration t, and the user risk value at iteration t, converge. Convergence determiner 808 may be configured, in one embodiment, to determine whether the content provider risk value at iteration t (as well as the user risk value at iteration t) converges. In some embodiments, convergence may correspond to when the representation of the content provider risk value no longer change from iteration t to iteration t+1. For example, a representation may be said to converge when that representation satisfies the convergence condition, such as that described by Equation 9:

$$|s_{CP}^{t+1} - s_{CP}^{t}| < \varepsilon \qquad \text{Equation 9.}$$

In Equation 9, $\varepsilon$ corresponds to a pre-defined value. For example, $\varepsilon$ may be equal to $10^{-6}$. When the representations of the content provider risk value does not change from iteration t to t+1 by more than $\varepsilon$ then the representation may be said to have converged. In some embodiments, $\varepsilon$ in Equations 8 and 9 may be equal, however persons of ordinary skill in the art will recognize that this is merely exemplary.

Converged content provider risk value determination unit 810 may be configured to identify the content provider risk value that convergence is reached for, and output the converged content provider risk value. In some embodiments, the converged content provider risk value may be provided to user/content provider pair risk value determination system 516. In some embodiments, the converged content provider risk value may further be stored within content provider risk value database 812 so that each converged content provider risk value for each user device-content provider pair is stored.

Figure 8B:
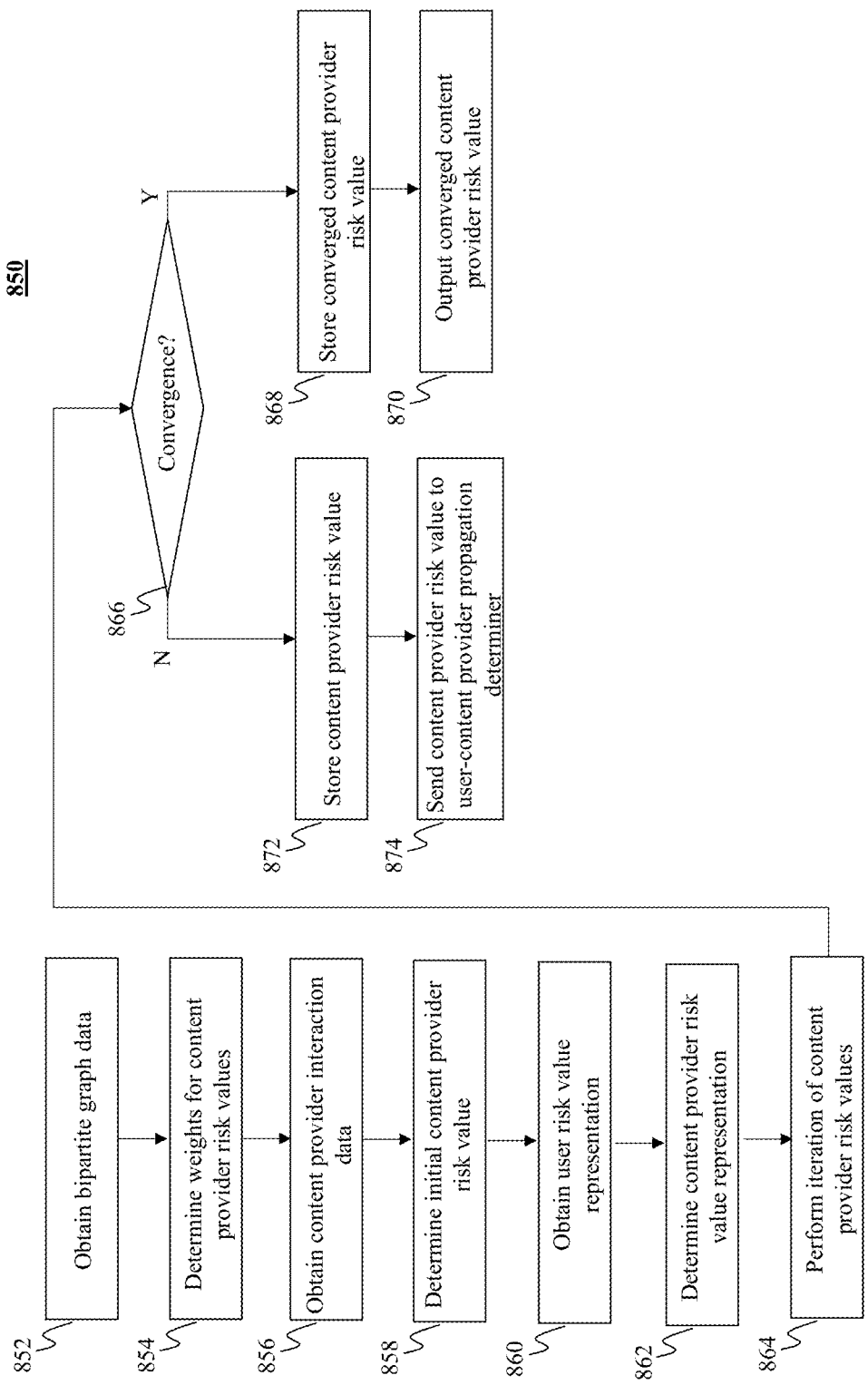
FIG. 8B is an illustrative flowchart of an exemplary process for determining and outputting a converged content provider risk value, in accordance with various embodiments of the present teaching.

FIG. 8B is an illustrative flowchart of an exemplary process for determining and outputting a converged content provider risk value, in accordance with various embodiments of the present teaching. Process 850, in a non-limiting embodiment, may begin at step 852. At step 852, bipartite graph data may be obtained. For instance, bipartite graph data generated by bipartite graph generator 510 may be obtained by content provider weighting identifier 802. At step 754, weights for the content provider risk values may be determined. For example, content provider weighting identifier 802 may determine, based at least in part on the bipartite graph data, one or more weights to be applied to the content provider risk values for the transition matrix of content providers to user devices.

At step 856, content provider interaction data may be obtained. For instance, the content provider interaction data may be obtained by initial content provider risk value determiner 804 from content provider interaction determiner 212. At step 858, the initial content provider risk value may be determined. For instance, initial content provider risk value determiner 804 may determine, based at least in part on the content provider event data, an initial content provider risk value. For example, the initial content provider risk value may correspond to the content provider CTR.

At step 860, the user risk value representation may be obtained. For instance, content provider risk value iteration unit 706 may receive the representation of the user risk value from user-content provider propagation determiner 512. Furthermore, content provider risk value iteration unit 806 may obtain the content provider to user weighted transition model $W^{CD,UD}$(i,j) from transition models 522. At step 862, the content provider risk value representation may be determined. In some embodiments, the content provider risk value representation may be described by Equation 4. At step 764, the iteration process of the content provider risk value (and the user risk value) may be performed. For instance, Equation 4 (and Equation 5) may be iterated from iteration t=0 to t=1, t=1 to t=2, etc. At step 866, a determination may be made as to whether the representation of the content provider risk value converges. For instance, convergence determiner 808 may be employed to determine whether convergence has been reached. In some embodiments, steps 860-866 of process 850 may be performed in parallel with steps 760-766 of process 750, as described above.

If, at step 866, it is determined that convergence has been reached, then process 850 may proceed to step 868. At step 868, the converged content provider risk value (e.g., the content provider risk value determined by Equation 4 when convergence is reached) may be stored. For instance, converged content provider risk value determination unit 810 may determine the converged content provider risk value, and may provide the converged content provider risk value to content provider risk value database 812 to be stored. At step 870, the converged content provider risk value may be output. For instance, converged content provider risk value determination unit 810 may output the converged content provider risk value to user/content provider pair risk value determination system 516.

If, however, at step 866, it is determined that convergence has not been reached, then process 850 proceed to step 872. At step 872, the content provider risk value determined from the most recent iteration may be stored. For instance, convergence determiner 808 may provide the content provider risk value to content provider risk value database 812 to be stored. At step 874, the content provider risk value may be sent to user-content provider propagation determiner 512. In this particular scenario, the iterated content provider risk value may be employed by user-content provider propagation determiner 512 to perform a subsequent iteration. Furthermore, in this particular scenario, the most recent iterated user risk value may further be obtained and provided to convergence determiner 808 for subsequent iterations.

Figure 9A:
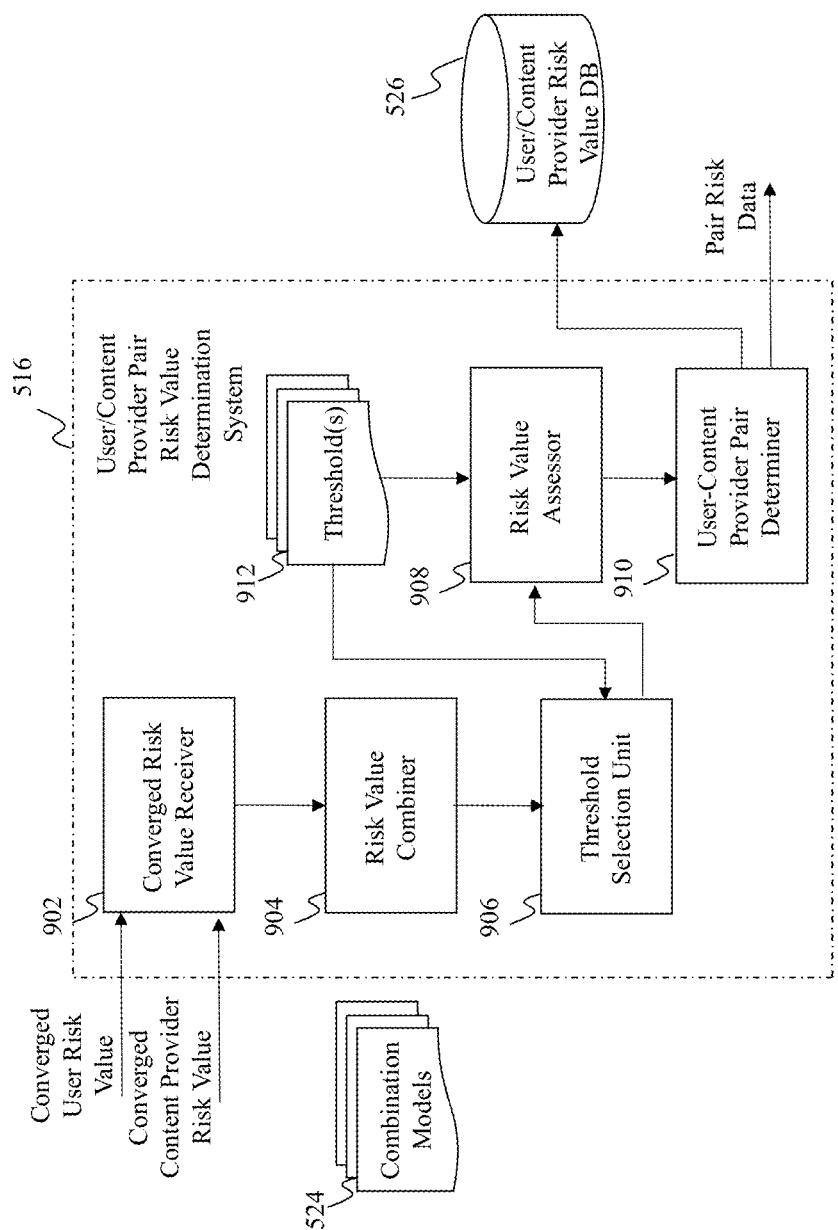
FIG. 9A is an illustrative diagram of an exemplary user/content provider pair risk value determination system, in accordance with various embodiments of the present teaching.

FIG. 9A is an illustrative diagram of an exemplary user/content provider pair risk value determination system, in accordance with various embodiments of the present teaching. User/content provider pair risk value determination unit 516, in the illustrative embodiment, may include a converged risk value receiver 902, a risk value combiner 904, a threshold selection unit 906, a risk value assessor 908, and a user-content provider pair determiner 910. In some embodiments, user/content provider pair risk value determination system 516 may implement one or more computer programs stored within memory using one or more processors in order to perform the functions associated with converged risk value receiver 902, risk value combiner 904, threshold selection unit 906, risk value assessor 908, and user-content provider pair determiner 910.

Converged risk value receiver 902, in one embodiment, may receive a converged user risk value as well as a converged content provider risk value. For instance, a converged user risk value may be received from user-content provider propagation determiner 512. A converged content provider risk value may be received from content provider-user propagation determiner 514. In some embodiments, converged risk value receiver 902 may receive data representing the converged user risk value and the converged content provider risk value from user-content provider propagation determiner 512 and content provider-user propagation determiner 514, respectively.

Risk value combiner 904 may be configured, in some embodiments, to execute one or more computer programs that combine the converged user risk value and the converged content provider risk value into a pair risk value for that particular content provider and user device pair. In some embodiments, risk value combiner 904 may employ one or more combination models 524, as previously discussed, to combine the converged user risk value and the converged content provider risk value. For instance, Equation 6 may correspond to one exemplary pair risk value determined by risk value combiner 904 using one or more combination models 524. Risk value combiner 904 may provide, in one embodiment, the pair risk value to threshold selection unit 906.

Threshold selection unit 906 may be configured, in one embodiment, to select a threshold from threshold(s) 912 to compare with the pair risk value output by risk value combiner 904. Threshold 912, for example, may correspond to a maximum acceptable risk value with which the pair risk value may have prior to being labeled as a fraudulent user device-content provider pair. In some embodiments, threshold 912 may specify that the threshold must be greater than zero (e.g., $\beta > 0$, where $\beta$ is a threshold). If the pair risk value, such as that described by Equation 6, is greater than the threshold 912, then all interactions on the corresponding publisher from the corresponding user device may be labeled as being fraudulent. Threshold selection unit 906 may then provide the selected threshold and the pair risk value to risk value assessor 908.

To determine a value for $\beta$, a cost analysis may be performed. For example, a precision-recall analysis may be employed. Different values for $\beta$ may yield different precision values and different recall values. As described herein, a precision value may be defined by Equation 10, and a recall value may be defined by Equation 11:

$$\text{Precision} = \frac{t_p}{t_p + f_p}. \qquad \text{Equation 10}$$

$$\text{Recall} = \frac{t_p}{t_p + f_n}. \qquad \text{Equation 11}$$

In Equations 10 and 11, $t_p$ corresponds to user interaction events (e.g., clicks) marked as being fraud in risk evaluation analysis (e.g., the processes performed by suspicious activity detection system 140) and traffic protection system. Traffic protection systems may, in the illustrative embodiment, correspond to a rule-based filter used to classify events as being fraud or non-fraud. Furthermore, $f_p$ may correspond to interaction events marked as being fraudulent only by the suspicious activity detection system 140, while $f_n$ may correspond to interaction events marked as being fraud only by the traffic protection system. Therefore, in one embodiment, $\beta$ may be selected such that (Precision+Recall)/2 is maximal.

Risk value assessor 908 may be configured, in one embodiment, to determine whether the pair risk value for the particular content provider-user device pair being analyzed is fraudulent, or displaying indicators indicating a high likelihood of fraudulence. For instance, risk value assessor 908 may compare the pair risk value to the threshold. Risk value assessor 908 may determine whether the pair risk value is greater than (or equal to) the threshold that was selected. If so, then risk value assessor 908 may provide the pair risk value, metadata indicating an identifier of the user device and content provider associated with the pair risk value, and a notification that the user device and content provider pair is to be labeled as fraudulent to user-content provider pair determiner 910. In some embodiments, the threshold that was selected may also be provided to user-content provider pair determiner. If risk value assessor 908 determines that the pair risk value does not exceed the threshold, then risk value assessor may also provide the pair risk value and metadata indicating an identifier of the user device and content provider associated with the pair risk value to user-content provider pair determiner 910, however a notification may further be provided that indicates that the user device and content provider pair is to be labeled as non-fraudulent. The selected threshold, in this scenario, may also be provided to user-content provider pair determiner 910.

User-content provider pair determiner 910 may be configured to determine user information and content provider information associated with the user device and the content provider from the user device-content provider pair. For example, user-content provider pair determiner 910 may be configured to obtain an identifier for the user device included within the user device-content provider pair (e.g., an IP address, MAC address, serial number, device identifier, etc.). Furthermore, user-content provider pair determiner 910 may be configured to obtain an identifier for the content provider included within the user device-content provider pair (e.g., a URL, an IP address associated with the content provider, and/or system account information). User-content provider pair determiner 910 may further be configured to generate and output pair data including the user information and the device information as well as an indicator that represents whether the user device and content provider of the user device-content provider pair are to be labeled as a fraudulent pair or a non-fraudulent pair. In some embodiments, the pair data may be output to user/content provider suspension system 216 for application of a fraudulent label. Furthermore, the pair data may, alternatively or additionally, be provided to user/content provider risk value database 526 to be stored.

Figure 9B:
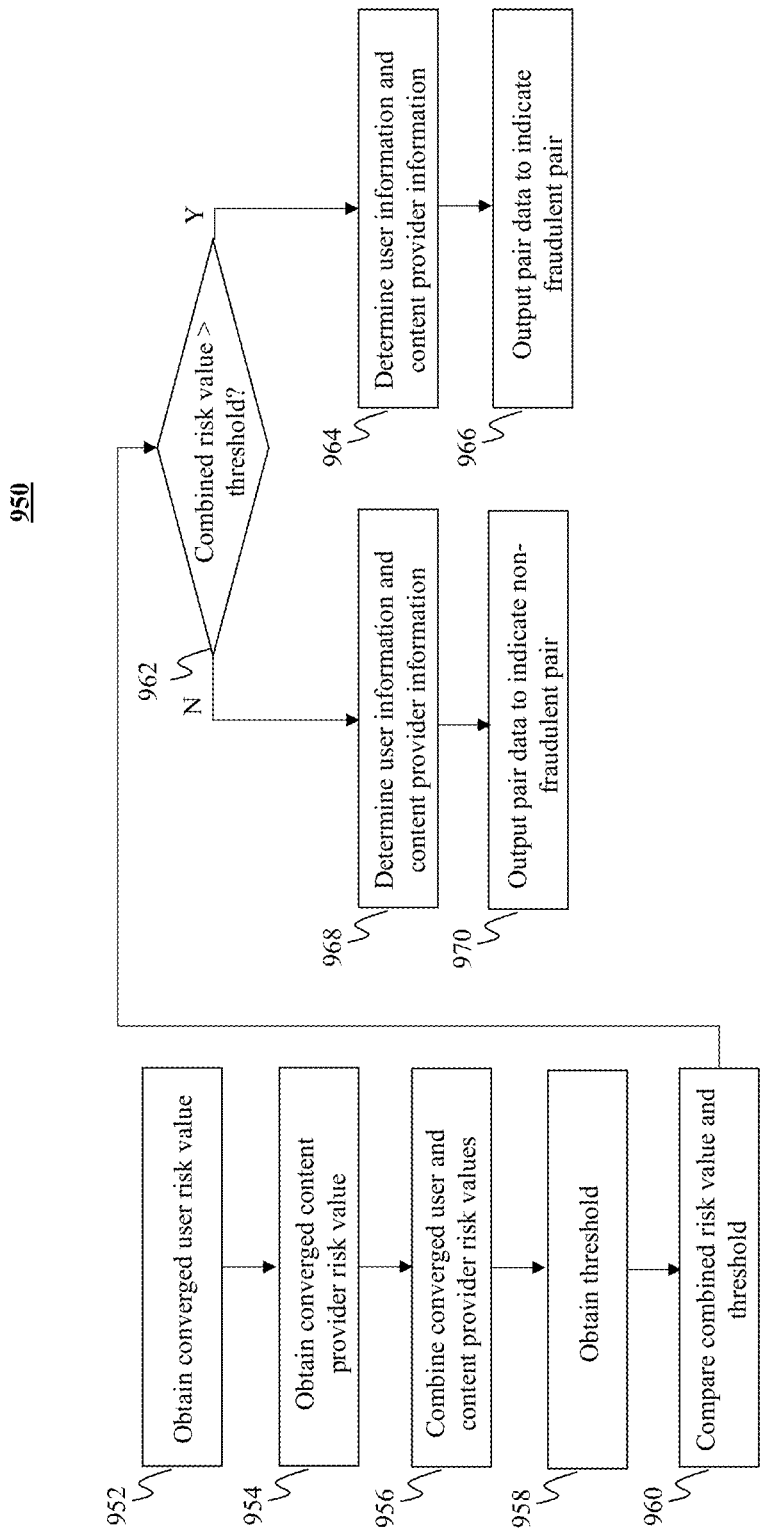
FIG. 9B is an illustrative flowchart of an exemplary process for determining and outputting pair data indicating fraudulent/non-fraudulent pair(s), in accordance with various embodiments of the present teaching.

FIG. 9B is an illustrative flowchart of an exemplary process for determining and outputting pair data indicating fraudulent/non-fraudulent pair(s), in accordance with various embodiments of the present teaching. Process 950, in a non-limiting embodiment, may begin at step 952. At step 952, the converged user risk value may be obtained. At step 954, the converged content provider risk value may be obtained. For instance, converged risk value receiver 902 may receive both the converged user risk value and the converged content provider risk value. In some embodiments, steps 952 and 954 may occur in parallel and/or may be performed as a single step.

At step 956, the converged user risk value and the converged content provider risk value may be combined. In some embodiments, the combined converged user risk value and converged content provider risk value may generate a pair risk value. For instance, risk value combiner 904 may combine the converged user risk value and the converged content provider risk value that were received from converged risk value receiver 902 using one or more of combination model(s) 514 (e.g., such as the combination represented by Equation 6), thereby generating the pair risk value $s_{CP,UD}(i,j)$. At step 958, a threshold may be obtained. For instance, threshold selection unit 906 may select and obtain a threshold 912 with which to compare the pair risk value.

At step 960, the combined risk value (e.g., the pair risk value) may be compared with the threshold. For instance, risk value assessor 908 may compare the pair risk value and the threshold. At step 962, a determination is made as to whether the combined risk value is greater than the threshold. If, at step 962, it is determined that the combined risk value is greater than the threshold, then process 950 may proceed to step 964. At step 964, user information associated with the user device of the user device-content provider pair may be determined. For instance, user-content provider pair determiner 910 may determine a user device identifier (e.g., an IP address) associated with the user device, as well as a content provider identifier (e.g., a URL) associated with the content provider. At step 966, pair data may be generated and output indicating that the user device-content provider pair is a fraudulent pair. For instance, the pair data may be provided to user/content provider suspension system 216.

If, however, at step 962 it is determined that the combined risk value is not greater than the threshold, then process 950 may proceed to step 968. At step 968, the user information associated with the user device and the content provider information associated with the content provider may be determined. Step 968 may be substantially similar to step 964 and the previous description may apply. At step 970, pair data may also be generated and output, similarly to step 966, however in this particular scenario, the pair data may indicate that the user device-content provider pair is non-fraudulent. In some embodiments, the pair data may be provided to user/content provider risk value database 526.

Figure 10A:
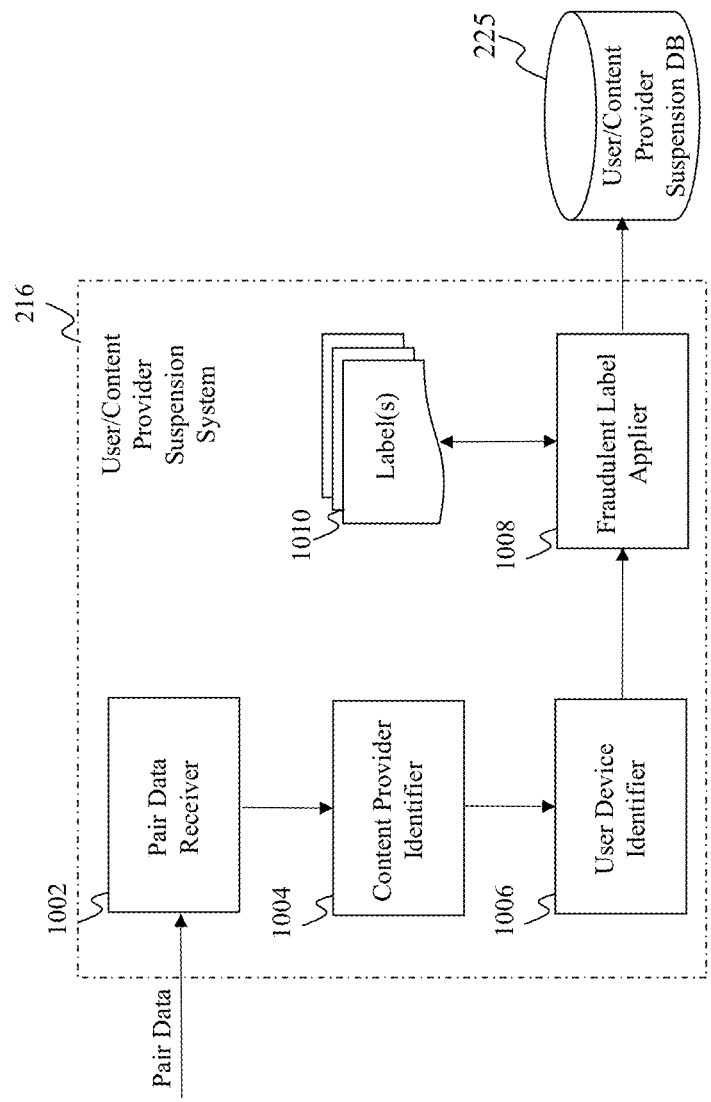
FIG. 10A is an illustrative diagram of an exemplary user/content provider suspension system, in accordance with various embodiments of the present teaching.

FIG. 10A is an illustrative diagram of an exemplary user/content provider suspension system, in accordance with various embodiments of the present teaching. User/content provider suspension system 216, in the illustrative embodiment, may include a pair data receiver 1002, a content provider identifier 1004, a user device identifier 1006, and a fraudulent label applier 1008. In some embodiments, user/content provider suspension system 216 may implement one or more computer programs stored within memory using one or more processors in order to perform the functions associated with pair data receiver 1002, content provider identifier 1004, user device identifier 1006, and fraudulent label applier 1008.

Pair data receiver 1002 may, in some embodiments, be configured to receive pair data. For instance, pair data receiver 1002 may receive the pair data that is output by user/content provider pair risk value determination system 516. In still further embodiments, pair data receiver 1002 may also be capable of receiving pair data from user/content provider risk value database 526. Pair data receiver 1002 may provide the pair data to content provider identifier 1004.

Content provider identifier 1004 may be configured to receive the pair data from pair data receiver 1002, and may determine an identifier, or identifiers, associated with the content provider represented within the pair data. For example, the pair data may indicate a user device-content provider pair that exhibits fraudulent behavior. Content provider identifier 1004 may determine one or more identifiers associated with the content provider such as, and without limitation, a URL associated with the content provider, one or more IP addresses associated with a server device of the content provider, one or more user accounts associated with the content provider, and the like. The identifiers may then be provided to user device identifier 1006 and/or fraudulent label applier 1008.

User device identifier 1006 may be configured to receive the pair data from pair data receiver 1002 and/or content provider identifier 1004, and may determine an identifier, or identifiers, associated with the user device represented within the pair data. For example, the pair data may indicate a user device-content provider pair that exhibits fraudulent behavior. User device identifier 1006 may determine one or more identifiers associated with that user device such as, and without limitation, an IP address of the user device, a MAC address of the user device, a device identifier, a serial number, a GPS location, and the like. The identifiers may then be provided to fraudulent label applier 1008.

Fraudulent label applier 1008 may be configured to apply one or more labels 1010 to the user device identifier(s) and the content provider identifier(s) that are determined to be fraudulent as indicated from the pair data. Application of the fraudulent label may correspond to annotating, modifying, and/or appending the corresponding identifiers to reflect that these identifiers are associated with fraudulent entities. In this way, subsequent user interactions detected by the flagged content provider from the flagged user device will be registered and prevent from resulting in a reward being received by that content provider and/or user device. In some embodiments, the user device identifier(s) and the content provider identifier(s) may be provided to user/content provider suspension database 225 to be stored. In this way, all future interactions detected by the flagged content provider will be mapped to user/content provider suspension database 225 to determine whether the interactions come from a user device that is flagged as well.

Figure 10B:
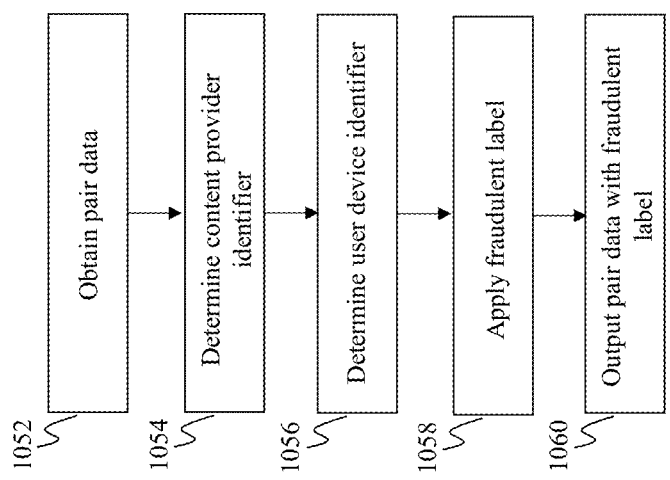
FIG. 10B is an illustrative flowchart of an exemplary process for applying a fraudulent label to a content provider and a user device, in accordance with various embodiments of the present teaching.

FIG. 10B is an illustrative flowchart of an exemplary process for applying a fraudulent label to a content provider and a user device, in accordance with various embodiments of the present teaching. Process 1050 may, in a non-limiting embodiment, begin at step 1052. At step 1052, pair data may be obtained. For instance, the pair data output by user/content provider pair risk value determination system 516 may be received by pair data receiver 1002. At step 1054, a content provider identifier (or identifiers) may be determined. For instance, content provider identifier 1004 may determine one or more identifiers associated with the content provider indicated as being fraudulent within the pair data. At step 1056, a user device identifier (or identifiers) may be determined. For instance, user device identifier 1006 may determine one or more identifiers associated with the user device indicated as being fraudulent within the pair data. At step 1058, the fraudulent label may be applied to the one or more content provider identifiers and the one or more user device identifiers. For instance, fraudulent label applier 1008 may apply the fraudulent labels. At step 1010, the pair data with the fraudulent labels applied thereto may be output. In some embodiments, the pair data with the fraudulent labels may be provided to user/content provider suspension database 225 to be stored.

Figure 11:
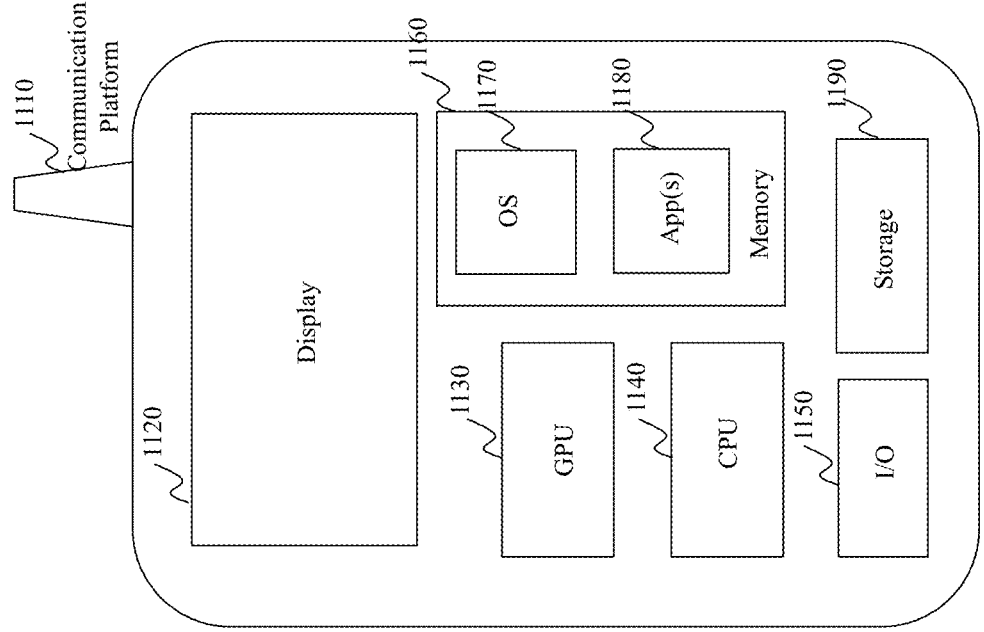
FIG. 11 is an illustrative diagram of an exemplary mobile device architecture that may be used to realize a specialized system implementing the present teaching in accordance with various embodiments.

FIG. 11 is an illustrative diagram of an exemplary mobile device architecture that may be used to realize a specialized system implementing the present teaching in accordance with various embodiments. In this example, the user device on which the fraudulent network detection systems and methods is implemented corresponds to a mobile device 800, including, but is not limited to, a smart phone, a tablet, a music player, a handled gaming console, a global positioning system (GPS) receiver, and a wearable computing device (e.g., eyeglasses, wrist watch, etc.), or in any other form factor. Mobile device 1100 may include one or more central processing units ("CPUs") 1140, one or more graphic processing units ("GPUs") 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170 (e.g., iOS, Android, Windows Phone, etc.), and one or more applications 1180 may be loaded into memory 1160 from storage 1190 in order to be executed by the CPU 1140. The applications 1180 may include a browser or any other suitable mobile apps for determining fraudulent networks on mobile device 1100. User interactions with the content may be achieved via the I/O devices 1150 and provided to the suspicious activity detection system 140.

To implement various modules, units, and their functionalities described in the present disclosure, computer hardware platforms may be used as the hardware platform(s) for one or more of the elements described herein (e.g., suspicious activity detection system 140). The hardware elements, operating systems and programming languages of such computers are conventional in nature, and it is presumed that those skilled in the art are adequately familiar therewith to adapt those technologies to detect fraudulent networks as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 12:
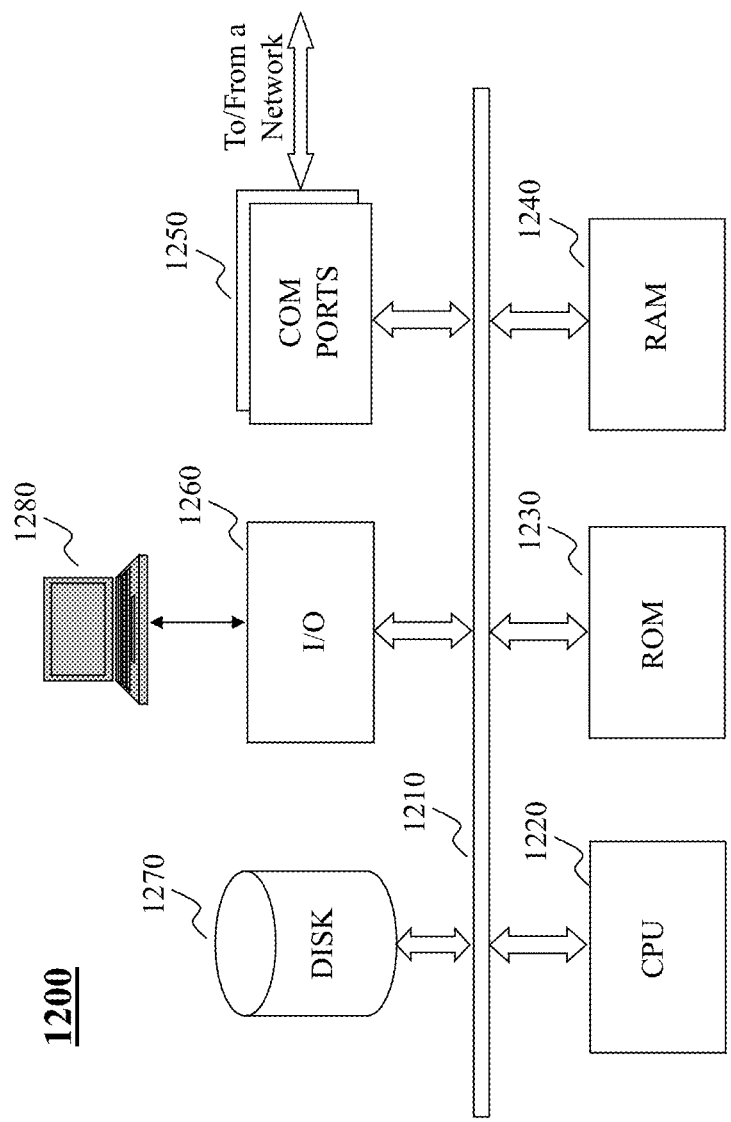
FIG. 12 is an illustrative diagram of an exemplary computing device architecture that may be used to realize a specialized system implementing the present teaching in accordance with various embodiments.

FIG. 12 is an illustrative diagram of an exemplary computing device architecture that may be used to realize a specialized system implementing the present teaching in accordance with various embodiments. Such a specialized system incorporating the present teaching has a functional block diagram illustration of a hardware platform, which includes user interface elements. The computer may be a general purpose computer or a special purpose computer. Both can be used to implement a specialized system for the present teaching. This computer 1200 may be used to implement any component of fraudulent network detection techniques, as described herein. For example, fraudulent network detection system may be implemented on a computer such as computer 1200, via its hardware, software program, firmware, or a combination thereof. Although only one such computer is shown, for convenience, the computer functions relating to fraudulent network detection as described herein may be implemented in a distributed fashion on a number of similar platforms, to distribute the processing load.

Computer 1200, for example, includes COM ports 1250 connected to and from a network connected thereto to facilitate data communications. Computer 1200 also includes a central processing unit (CPU) 1220, in the form of one or more processors, for executing program instructions. The exemplary computer platform includes an internal communication bus 1210, program storage and data storage of different forms (e.g., disk 1270, read only memory (ROM) 1230, or random access memory (RAM) 1240), for various data files to be processed and/or communicated by computer 1200, as well as possibly program instructions to be executed by CPU 1220. Computer 1200 also includes an I/O component 1260, supporting input/output flows between the computer and other components therein such as user interface elements 1280. Computer 1200 may also receive programming and data via network communications.

Hence, aspects of the methods of detecting fraudulent networks and/or other processes, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, in connection with detection fraudulent networks. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, the fraudulent network detection techniques as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method for identifying fraudulent content provider-user device pairs, the method being implemented on at least one computing device having at least one processor, memory, and communications circuitry, and the method comprising:
    determining, via the at least one processor, an initial user risk value associated with a user device of a plurality of user devices, wherein the initial user risk value is a click-through-rate for the user device;
    determining, via the at least one processor, an initial content provider risk value associated with a content provider, of a plurality of content providers, wherein the initial content provider risk value is a click-through-rate for the content provider;
    generating relational data corresponding to a transition matrix recording a number of clicks detected by each of the plurality of content providers from each of the plurality of user devices;
    obtaining a transition probability between each of the plurality of user devices and each of the plurality of content providers;
    generating a weighted transition matrix by weighing each value in the transition matrix using a corresponding transition probability;
    generating, via the at least one processor, a first representation of a user risk value and a second representation of a content provider risk value, wherein the first representation at an iteration is dependent on the second representation at a previous iteration and the initial user risk value and the weighted transition matrix, while the second representation at an iteration is dependent on the first representation at a previous iteration and the initial content provider risk value and the weighted transition matrix;
    performing iterations for the first and second representations until the first and second representations converge to determine
    a converged user risk value and a converged content provider risk value;
    determining, via the at least one processor, a pair risk value dependent on the converged user risk value and the converged content provider risk value and the transition matrix;
    in response to the pair risk value being greater than or equal to a threshold risk value selected to maximize an average of a precision value and a recall value or a maximum acceptable risk value with which the pair risk value may have prior to a user device-content provider pair being labeled as fraudulent, editing a network identifier of the content provider and a network identifier of the user device to create, via the at least one processor, fraudulence labels therefor to indicate that the content provider and the user device are fraudulent entities, wherein the edited network identifiers are stored in a database;
    detecting, by the at least one processor via the fraudulent labels for the fraudulent entities, subsequent interactions involving the content provider and the user device; and
    determining, via the at least one processor based on the database, the subsequent interactions as fraudulent to prevent the subsequent interactions from resulting in a reward being received by the content provider and/or the user device.

2. The method of claim 1, further comprising:
    obtaining, prior to the initial user risk value being determined, user interaction data representing user interactions with the content provider in relation to a total amount of content presented to the user device by the content provider; and
    obtaining, prior to the initial content provider risk value being determined, content provider interaction data representing interactions by the user device with content presented by the content provider in relation to the total amount of content.

3. The method of claim 2, wherein the user interaction data indicates the portion of content items, presented to the user device, that have been clicked, and the content provider interaction data indicates the portion of content items, presented by the content provider, that have been clicked.

4. The method of claim 1, wherein determining the converged user risk value and the converged content provider risk value comprises:
    a) determining a first user risk value of the first representation;
    b) determining a first content provider risk value of the second representation;
    c) determining a first difference between the first user risk value and the initial user risk value;
    d) determining a second difference between the first content provider risk value and the initial content provider risk value;
    e) determining whether the first difference and the second difference are less than a convergence threshold value; and
    f) repeating steps a)-e) if the first difference and the second difference satisfy a convergence condition, wherein the first user risk value is used as the initial user risk value and the first content provider risk value is used as the initial content provider risk value during the repeating of steps a)-e), and the convergence condition comprises the change in the first representation and the second representation being less than the convergence value.

5. The method of claim 1, wherein the generating the relational data comprises:
  determining, for each of the plurality of content providers, a number of user interactions associated with each of the plurality of user devices;
  generating first transitional data representing transitions from user devices to content providers; and
  generating second transitional data representing transitions from content providers to user devices, wherein the first transitional data and the second transitional data are normalized.

6. The method of claim 1, further comprising:
  obtaining content provider interaction data representing one or more subsequent user interactions detected by the content provider;
  determining that the content provider comprises the fraudulent label; and
  preventing one or more rewards from being provided to the content provider in response to the one or more subsequent user interactions based on the pair risk value being greater than or equal to the threshold risk value.

7. The method of claim 1, further comprising:
  generating a bipartite representation indicating the interaction relationship between each of the plurality of user devices and each of the plurality of content providers; and
  determining, based on the bipartite representation, at least one of: one or more of the plurality of user devices with which to apply a first weight to a corresponding user risk value, and one or more of the plurality of content providers with which to apply a second weight to a corresponding content provider risk value.

8. A system for identifying fraudulent content provider-user device pairs, the system comprising at least one processor and memory storing computer program instructions, the system comprising:
  a user interaction determiner, implemented via the at least one processor executing the computer program instructions, and configured to determine an initial user risk value associated with a user device, of a plurality of user devices, wherein the initial user risk value is a click-through-rate for the user device;
  a content provider interaction determiner, implemented via the at least one processor executing the computer program instructions, and configured to determine an initial content provider risk value associated with a content provider, of a plurality of content providers, wherein the initial content provider risk value is a click-through-rate for the content provider;
  a transition model generator, implemented via the at least one processor executing the computer program instructions, and configured to generate relational data corresponding to a transition matrix recording a number of clicks detected by each of the plurality of content providers from each of the plurality of user devices;
  a risk determination system, implemented via the at least one processor executing the computer program instructions, and configured to:
    obtain a transition probability between each of the plurality of user devices and each of the plurality of content providers;
    generate a weighted transition matrix by weighing each value in the transition matrix using a corresponding transition probability;
    generate a first representation of a user risk value and a second representation of a content provider risk value, wherein the first representation at an iteration is dependent on the second representation at a previous iteration and the initial user risk value and the weighted transition matrix, while the second representation at an iteration is dependent on the first representation at a previous iteration and the initial content provider risk value and the weighted transition matrix,
    perform iterations for the first and second representations until the first and second representations converge to determine a converged user risk value and a converged content provider risk value, and
    determine a pair risk value dependent on the converged user risk value and the converged content provider risk value and the transition matrix; and
  a user/content provider suspension system, implemented via the at least one processor executing the computer program instructions, and configured to:
    in response to the pair risk value being greater than or equal to a threshold risk value selected to maximize an average of a precision value and a recall value or a maximum acceptable risk value with which the pair risk value may have prior to a user device-content provider pair being labeled as fraudulent, edit a network identifier of the content provider and a network identifier of the user device to create fraudulence labels therefor to indicate that the content provider and the user device are fraudulent entities, wherein the edited network identifiers are stored in a database;
    detect, via the fraudulent labels for the fraudulent entities, subsequent interactions involving the content provider and the user device, and
    determine, based on the database, the subsequent interactions as fraudulent to prevent the subsequent interactions from resulting in a reward being received by the content provider and/or the user device.

9. The system of claim 8, wherein:
  the user interaction determiner is further configured to obtain user interaction data representing user interactions with the content provider in relation to a total amount of content presented to the user device by the content provider; and
  the content provider interaction determiner is further configured to obtain content provider interaction data representing interactions by the user device with content presented by the content provider in relation to the total amount of content.

10. The system of claim 9, wherein the user interaction data indicates the portion of content items, presented to the user device, that have been clicked, and the content provider interaction data indicates the portion of content items, presented by the content provider, that have been clicked.

11. The system of claim 8, wherein the risk determination system is further configured to:
  a) determine a first user risk value of the first representation;
  b) determine a first content provider risk value of the second representation;
  c) determine a first difference between the first user risk value and the initial user risk value;
  d) determine a second difference between the first content provider risk value and the initial content provider risk value;
  e) determine whether the first difference and the second difference are less than a convergence threshold value; and f) repeat steps a)-e) if the first difference and the second difference satisfy a convergence condition, wherein the first user risk value is used as the initial user risk value and the first content provider risk value is used as the initial content provider risk value during the repeating of steps a)-e), and the convergence condition comprises the change in the first representation and the second representation being less than the convergence value.

12. The system of claim 8, wherein the transition model generator is further configured to:
   generate the relational data by determining, for each of the plurality of content providers, a number of user interactions associated with each of the plurality of user devices,
   generate first transitional data representing transitions from user devices to content providers, and
   generate second transitional data representing transitions from content providers to user devices, wherein the first transitional data and the second transitional data are normalized.

13. The system of claim 8, wherein the user/content provider suspension system is further configured to:
   obtain content provider interaction data representing one or more user interactions detected by the content provider;
   determine that the content provider comprises the fraudulent label; and
   prevent monetary compensation from being provided to the content provider in response to the one or more user interactions based on the pair risk value being greater than or equal to the threshold risk value.

14. The system of claim 8, wherein the risk determination system further comprises:
   a bipartite graph generator configured to generate a bipartite representation indicating the interaction relationship between each of the plurality of user devices and each of the plurality of content providers; and
   a user/content provider pair risk value determination system configured to determine, based on the bipartite representation, at least one of: one or more of the plurality of user devices with which to apply a first weight to a corresponding user risk value, and one or more of the plurality of content providers with which to apply a second weight to a corresponding content provider risk value.

15. A non-transitory computer readable medium comprising one or more instructions that, when executed by at least one processor of a computing device, effectuate operations comprising:
   determining an initial user risk value associated with a user device, of a plurality of user devices, wherein the initial user risk value is a click-through-rate for the user device;
   determining an initial content provider risk value associated with a content provider of a plurality of content providers, wherein the initial content provider risk value is a click-through-rate for the content provider;
   generating relational data corresponding to a transition matrix recording a number of clicks detected by each of the plurality of content providers from each of the plurality of user devices;
   obtaining a transition probability between each of the plurality of user devices and each of the plurality of content providers;
   generating a weighted transition matrix by weighing each value in the transition matrix using a corresponding transition probability;
   generating a first representation of a user risk value and a second representation of a content provider risk value, wherein the first representation at an iteration is dependent on the second representation at a previous iteration and the initial user risk value and the weighted transition matrix, while the second representation at an iteration is dependent on the first representation at a previous iteration and the initial content provider risk value and the weighted transition matrix;
   performing iterations for the first and second representations until the first and second representations converge to determine a converged user risk value and a converged content provider risk value;
   determining a pair risk value dependent on the converged user risk value and the converged content provider risk value and the transition matrix;
   in response to the pair risk value being greater than or equal to a threshold risk value selected to maximize an average of a precision value and a recall value or a maximum acceptable risk value with which the pair risk value may have prior to a user device-content provider pair being labeled as fraudulent, a network identifier of the content provider and a network identifier of the user device to create fraudulence labels therefor to indicate that the content provider and the user device are fraudulent entities, wherein the edited network identifiers are stored in a database;
   detecting, via the fraudulent labels for the fraudulent entities, subsequent interactions involving the content provider and the user device; and
   determining, based on the database, the subsequent interactions as fraudulent to prevent the subsequent interactions from resulting in a reward being received by the content provider and/or the user device.

16. The non-transitory computer readable medium of claim 15, wherein the operations further comprise:
   obtaining, prior to the initial user risk value being determined, user interaction data representing user interactions with the content provider in relation to a total amount of content presented to the user device by the content provider; and
   obtaining, prior to the initial content provider risk value being determined, content provider interaction data representing interactions by the user device with content presented by the content provider in relation to the total amount of content.

17. The non-transitory computer readable medium of claim 15, wherein determining the user risk value and the content provider risk value comprises:
   a) determining a first user risk value of the first representation;
   b) determining a first content provider risk value of the second representation;
   c) determining a first difference between the first user risk value and the initial user risk value;
   d) determining a second difference between the first content provider risk value and the initial content provider risk value;
   e) determining whether the first difference and the second difference are less than a convergence threshold value; and
   f) repeating steps a)-e) if the first difference and the second difference satisfy a convergence condition, wherein the first user risk value is used as the initial user risk value and the first content provider risk value is used as the initial content provider risk value during the repeating of steps a)-e), and the convergence condition comprises the change in the first representation and the second representation being less than the convergence value.

18. The non-transitory computer readable medium of claim 15, wherein the generating the relational data comprises:
    determining, for each of the plurality of content providers, a number of user interactions associated with each of the plurality of user devices;
        generating first transitional data representing transitions from user devices to content providers; and
        generating second transitional data representing transitions from content providers to user devices, wherein the first transitional data and the second transitional data are normalized.

19. The non-transitory computer readable medium of claim 15, wherein the operations further comprise:
    obtaining content provider interaction data representing one or more user interactions detected by the content provider;
    determining that the content provider comprises the fraudulent label; and
    preventing monetary compensation from being provided to the content provider in response to the one or more user interactions based on the pair risk value being greater than or equal to the threshold risk value.

20. The non-transitory computer readable medium of claim 15,
    wherein the operations further comprise:
        generating a bipartite representation indicating the interaction relationship between each of the plurality of user devices and each of the plurality of content providers; and
        determining, based on the bipartite representation, at least one of: one or more of the
    plurality of user devices with which to apply a first weight to a corresponding user risk value,
    and one or more of the plurality of content providers with which to apply a second weight to a
    corresponding content provider risk value.

* * * * *